(12) United States Patent
Mimassi et al.

(10) Patent No.: US 11,568,413 B2
(45) Date of Patent: Jan. 31, 2023

(54) SYSTEM AND METHOD FOR MINIMAL CONTACT IN-PERSON ORDER FULFILLMENT USING A MOBILE DEVICE

(71) Applicant: RockSpoon, Inc., San Jose, CA (US)

(72) Inventors: Nagib Georges Mimassi, Palo Alto, CA (US); Juliana Moreira Mendes Candura, São Paulo (BR); Josiane Issa, São Paulo (BR)

(73) Assignee: ROCKSPOON, INC., San Jose, CA (US)

( * ) Notice: Subject to any disclaimer, the term of this patent is extended or adjusted under 35 U.S.C. 154(b) by 0 days.

(21) Appl. No.: 17/736,066

(22) Filed: May 3, 2022

(65) Prior Publication Data

US 2022/0261813 A1   Aug. 18, 2022

Related U.S. Application Data

(63) Continuation-in-part of application No. 17/406,862, filed on Aug. 19, 2021, now Pat. No. 11,321,715, which is a continuation of application No. 17/147,284, filed on Jan. 12, 2021, now Pat. No. 11,017,401, which is a continuation-in-part of application No. 16/950,101, filed on Nov. 17, 2020, now Pat. No. 11,010,764, which is a continuation-in-part of application No. 17/005,038, filed on Aug. 27, 2020, now Pat. No. 11,232,426, which is a continuation-in-part of application No. 16/796,342, filed on Feb. 20, 2020, now Pat. No. 10,803,442.

(60) Provisional application No. 62/938,817, filed on Nov. 21, 2019, provisional application No. 62/964,413, filed on Jan. 22, 2020, provisional application No. 62/964,422, filed on Jan. 22, 2020, provisional application No. 63/091,994, filed on Oct. 15, 2020, provisional application No. 63/133,761, filed on Jan. 4, 2021.

(51) Int. Cl.
*G06Q 20/40* (2012.01)
*G06Q 20/32* (2012.01)
*G06F 16/23* (2019.01)

(52) U.S. Cl.
CPC .......... *G06Q 20/40145* (2013.01); *G06F 16/2379* (2019.01); *G06Q 20/3227* (2013.01)

(58) Field of Classification Search
CPC ......... G06Q 20/40; G06Q 20/32; G06F 16/23
See application file for complete search history.

(56) References Cited

U.S. PATENT DOCUMENTS

| | | |
|---|---|---|
| 8,556,164 B1 | 10/2013 | Freedman et al. |
| 10,262,148 B2 | 4/2019 | Cote |
| 2016/0162878 A1* | 6/2016 | Kramer ............... G06Q 20/385 705/39 |

(Continued)

*Primary Examiner* — Scott S Trotter
(74) *Attorney, Agent, or Firm* — Galvin Patent Law LLC; Brian R. Galvin

(57) ABSTRACT

A system and method for minimal contact in-person order fulfillment using mobile device, using a banking card, mobile device, card reader and associated display, cashier display at a point-of-sale ("POS") system, internet-connected server, and financial institution, which minimizes customer physical contact with payment personnel or physical systems by offloading the final stages of sale confirmation and customer choices onto a customer's mobile device.

14 Claims, 16 Drawing Sheets

(56) References Cited

U.S. PATENT DOCUMENTS

| | | |
|---|---|---|
| 2019/0272593 A1 | 9/2019 | Sokol et al. |
| 2019/0279198 A1 | 9/2019 | Laracey |
| 2020/0380495 A1 | 12/2020 | Kang |

* cited by examiner

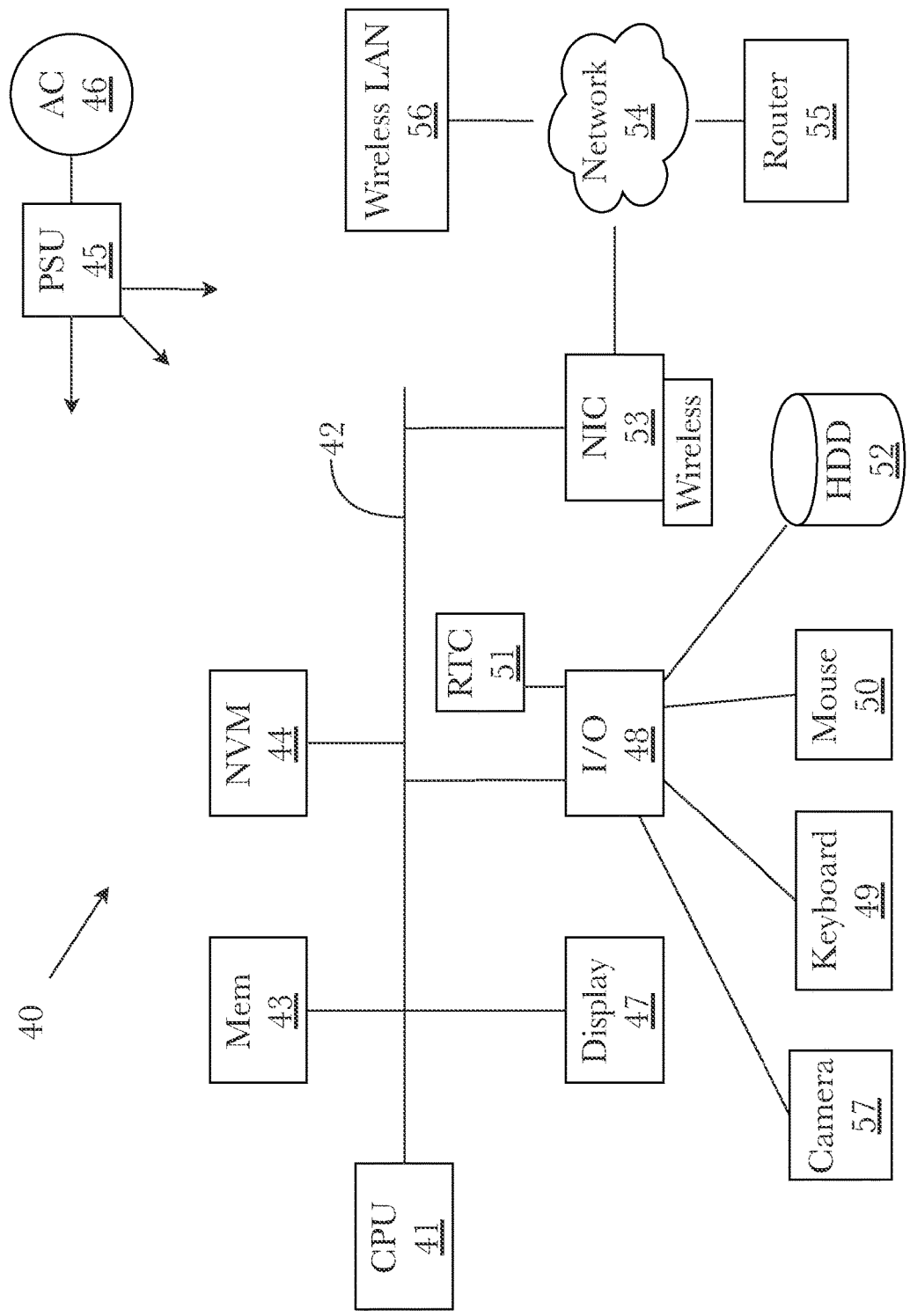

SYSTEM AND METHOD FOR MINIMAL CONTACT IN-PERSON ORDER FULFILLMENT USING A MOBILE DEVICE

CROSS-REFERENCE TO RELATED APPLICATIONS

Priority is claimed in the application data sheet to the following patents or patent applications, the entire written description of each of which is expressly incorporated herein by reference in its entirety:
Ser. No. 17/406,862
Ser. No. 17/147,284
Ser. No. 16/950,101
Ser. No. 17/005,038
Ser. No. 16/796,342
62/938,817
62/964,413
62/964,422
63/091,994
63/133,761

BACKGROUND

Field of the Art

The disclosure relates to the field of point-of-sale systems, and more particularly to the field of point-of-sale systems utilizing cashiers, card reader displays, and user mobile devices to minimize customer physical contact.

Discussion of the State of the Art

It is a current danger that many face, to go shopping for groceries and goods they need to continue their lives productively and safely. Among the many problems facing the modern consumer, there exist few options for no-contact purchasing of goods for customers that do not have delivery options available, requiring them to go to the store and interact with checkout machines in a constant capacity, potentially infecting themselves in the current global environment, and otherwise inconveniencing and limiting possibilities for merchants to interact with customers at checkout by having a lack of abstraction between the point-of-sale ("POS") and customer.

SUMMARY

Accordingly, the inventor has conceived and reduced to practice, a system and method for minimal contact in-person order fulfillment using mobile device, using a banking card, mobile device, card reader and associated display, cashier display at a point-of-sale ("POS") system, internet-connected server, and financial institution, which minimizes customer physical contact with payment personnel or physical systems by offloading the final stages of sale confirmation and customer choices onto a customer's mobile device.

According to one aspect, a system for minimal contact in-person order fulfillment using a mobile device is disclosed, comprising: a server comprising at least a transaction page generator; a mobile device comprising at least a first plurality of programming instructions stored in the at least one memory of, and operating on at least one processor of, a computer system, wherein the first plurality of programming instructions, when operating on the at least one processor, cause the computer system to: allow a mobile device user to assemble an order, the order comprising at least an order description; wherein completing the assembled order initiates a request for a QR code; generate a QR code, the QR code comprising at least a user identification, an order description, and payment details; and display the QR code; and a transaction page generator comprising at least a second plurality of programming instructions stored in the at least one memory of, and operating on at least one processor of, a computer system, wherein the second plurality of programming instructions, when operating on the at least one processor, cause the computer system to: receive a request for a generated transaction page from a point-of-sale; generate at least one interactive web page for a business; generate a URL associated with a specific user transaction based on a point-of-sale transaction page request; and send the generated URL to a point-of-sale; and a point-of-sale comprising at least a third plurality of programming instructions stored in the at least one memory of, and operating on at least one processor of, a computer system, wherein the third plurality of programming instructions, when operating on the at least one processor, cause the computer system to: scan the QR code displayed by the mobile device; request a generated transaction page from the transaction page generator; receive the generated URL from the transaction page generator; and send the URL to the mobile device, responsive to scanning the QR code.

According to another aspect, a method for minimal contact in-person order fulfillment using a mobile device is disclosed, comprising the steps of: allowing a mobile device user to assemble an order, the order comprising at least an order description, using a mobile device; wherein completing the assembled order initiates a request for a QR code, using the mobile device; generating a QR code, the QR code comprising at least a user identification, an order description, and payment details, using the mobile device; displaying the QR code, using the mobile device; receiving a request for a generated transaction page from a point-of-sale, using a transaction page generator; generating at least one interactive web page for a business, using the transaction page generator; generating a URL associated with a specific user transaction based on a point-of-sale transaction page request, using the transaction page generator; sending the generated URL to a point-of-sale; scanning the QR code displayed by the mobile device, using a point-of-sale; requesting a generated transaction page from the transaction page generator, using the point-of-sale; receiving the generated URL from the transaction page generator, using the point-of-sale; and sending the URL to the mobile device responsive to scanning the QR code, using the point-of-sale.

According to an aspect of an embodiment, the point-of-sale is further configured to: initiate a transaction; allow a customer to insert a banking card; wherein the banking card may be a credit card, debit card, gift card, or a prepaid banking card; process an inserted banking card; display a transaction completion message when a transaction is completed successfully; and use data received from the mobile device to complete and finalize a transaction.

According to an aspect of an embodiment, the mobile device is further configured to: load at least one interactive web page associated with the received URL; allow a customer to interact with the at least one interactive web page; and send data based on the customer interactions to the point-of-sale.

According to an aspect of an embodiment, the data based on the customer interactions is sent from a mobile device to a server, which then sends data to a point-of-sale in order for the point-of-sale to complete a transaction based on data from the customer interactions.

According to an aspect of an embodiment, the point-of-sale further comprises a card reader with a separate display from a cashier terminal or device.

According to an aspect of an embodiment, the server is operated by a financial institution for the purposes of facilitating business transactions for the financial institution's business clients.

According to an aspect of an embodiment, the mobile device further comprises a specialized application for scanning QR codes and interacting with the interactive web pages provided by a transaction page generator.

BRIEF DESCRIPTION OF THE DRAWING FIGURES

The accompanying drawings illustrate several aspects and, together with the description, serve to explain the principles of the invention according to the aspects. It will be appreciated by one skilled in the art that the particular arrangements illustrated in the drawings are merely exemplary, and are not to be considered as limiting of the scope of the invention or the claims herein in any way.

FIG. 16 is another block diagram illustrating an exemplary hardware architecture of a computing device.

DETAILED DESCRIPTION

Figure 1:
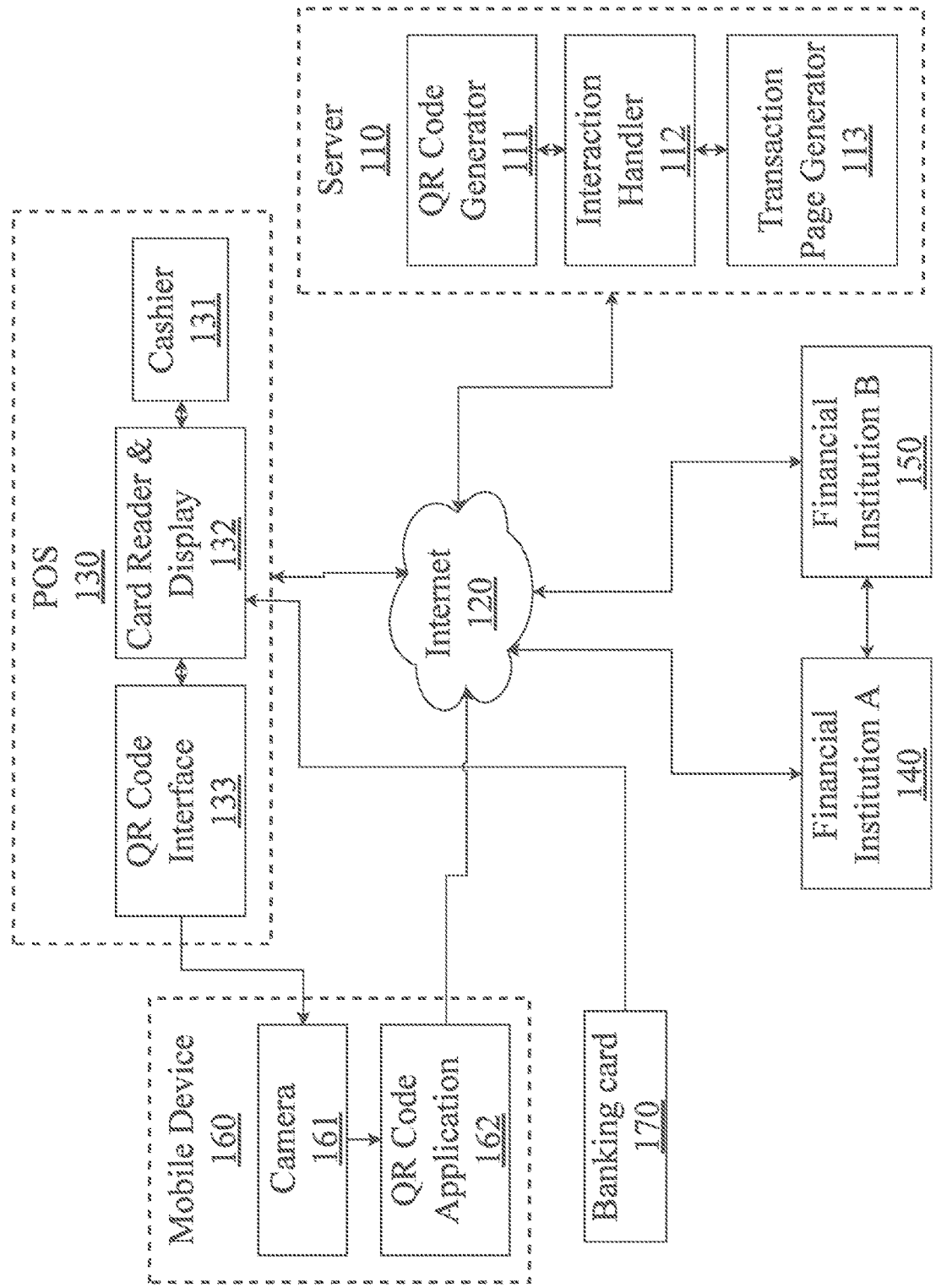
FIG. 1 is a block diagram illustrating an exemplary system architecture for minimal contact in-person business transactions using a banking card and mobile device, according to a preferred embodiment.

The inventor has conceived, and reduced to practice, a system and method for minimal contact in-person order fulfillment using a mobile device.

One or more different aspects may be described in the present application. Further, for one or more of the aspects described herein, numerous alternative arrangements may be described; it should be appreciated that these are presented for illustrative purposes only and are not limiting of the aspects contained herein or the claims presented herein in any way. One or more of the arrangements may be widely applicable to numerous aspects, as may be readily apparent from the disclosure. In general, arrangements are described in sufficient detail to enable those skilled in the art to practice one or more of the aspects, and it should be appreciated that other arrangements may be utilized and that structural, logical, software, electrical and other changes may be made without departing from the scope of the particular aspects. Particular features of one or more of the aspects described herein may be described with reference to one or more particular aspects or figures that form a part of the present disclosure, and in which are shown, by way of illustration, specific arrangements of one or more of the aspects. It should be appreciated, however, that such features are not limited to usage in the one or more particular aspects or figures with reference to which they are described. The present disclosure is neither a literal description of all arrangements of one or more of the aspects nor a listing of features of one or more of the aspects that must be present in all arrangements.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible aspects and in order to more fully illustrate one or more aspects. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the aspects, and does not imply that the illustrated process is preferred. Also, steps are generally described once per aspect, but this does not mean they must occur once, or that they may only occur once each time a process, method, or algorithm is carried out or executed. Some steps may be omitted in some aspects or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other aspects need not include the device itself.

Techniques and mechanisms described or referenced herein will sometimes be described in singular form for clarity. However, it should be appreciated that particular aspects may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various aspects in which, for example, functions may be executed out of order from that shown or discussed, including substantially concurrently or in reverse order, depending on the functionality involved, as would be understood by those having ordinary skill in the art.

Definitions

"Artificial intelligence" or "AI" as used herein means a computer system or component that has been programmed in such a way that it mimics some aspect or aspects of cognitive functions that humans associate with human intelligence, such as learning, problem solving, and decision-making. Examples of current AI technologies include understanding human speech, competing successfully in strategic games such as chess and Go, autonomous operation of vehicles, complex simulations, and interpretation of complex data such as images and video.

"Machine learning" as used herein is an aspect of artificial intelligence in which the computer system or component can modify its behavior or understanding without being explicitly programmed to do so. Machine learning algorithms develop models of behavior or understanding based on information fed to them as training sets, and can modify those models based on new incoming information. An example of a machine learning algorithm is AlphaGo, the first computer program to defeat a human world champion in the game of Go. AlphaGo was not explicitly programmed to play Go. It was fed millions of games of Go, and developed its own model of the game and strategies of play.

"Neural network" as used herein means a computational model, architecture, or system made up of a number of simple, highly interconnected processing elements which process information by their dynamic state response to external inputs, and is thus able to "learn" information by recognizing patterns or trends. Neural networks, also sometimes known as "artificial neural networks" are based on our understanding of the structure and functions of biological neural networks, such as the brains of mammals. A neural network is a framework for application of machine learning algorithms.

Conceptual Architecture

FIG. 1 is a block diagram illustrating an exemplary system architecture for minimal contact in-person business transactions using a banking card and mobile device, according to a preferred embodiment. A server 110 operates at least a QR code generator 111, interaction handler 112, and transaction page generator 113, which may be separate devices connected directly or over a network and interacting with a server 110, or may be software operating on the server 110 itself, or software operating over a network and communicating over a network with the server 110. Such a server may be operating one of a variety of operating systems and server software including WINDOWS SERVER™, LINUX™, APACHE™, or other software. The server 110 may also run other software or have other hardware components aside from only the QR code generator 111, interaction handler 112, and transaction page generator 113. A QR code generator 111 is a tool or set of tools for taking a certain Uniform Resource Locator ("URL") and encoding it as a QR code to be sent to requesting users. The URL encoded by the QR code generator 111 is a URL generated by a transaction page generator 113, the interactions between the two devices, and interactions with external services such as a third party POS 130, being handled by an interaction handler 112. A transaction page may be generated simply as an interactive web page such as one designed with JAVASCRIPT™ elements, or such as one compiled with WEBASSEMBLY™ technology, that allows a user to input data such as a tip amount, their signature, receipt preferences, email preferences, or other data, as applicable and determined by the POS 130, in order to complete a transaction. The internet 120 may be used to facilitate communications between several different devices or institutions or individuals, including a customer's mobile device 160, a business POS 130, a server 110, and at least one but potentially multiple financial institutions 140, 150. A business's POS 130 may have components including a cashier module or display 131, a card reader and associated display 132, and a QR code interface 133. A cashier module or display 131 is the part of the system attended to by an actual cashier, and may be handled automatically as part of a self-checkout device or by a human such as in a supermarket. The card reader and display 132 is a device that allows at least the insertion of a banking card 170 from a customer and is capable of displaying images at least in the required resolution for a QR code to be displayed, which may be performed with a QR code interface 133 if no separate screen for the card reader is possible. For example, if a card reader is a small hand-held card reader without a moderate resolution digital display, a separate device for a QR code interface 133 may be present to display the QR code. In other instances, the QR code interface 133 may be merely a part of the card reader and display 132, a software component able to render the QR code on the screen. A banking card 170 may also be swiped or instead held nearby if it is RFID enabled or similar. Regardless of which implementation is used by a given POS 130, a customer must have not only their banking card 170 but also a mobile device 160 with a camera 161 and QR code application 162, such as a tablet computer or a smartphone. The QR code application 162 is software operating on the mobile device 160 that may use the camera 161 to identify and scan QR codes the camera is pointed to, and access the URL that they encode, along with possibly other features including interactive web page integration and the ability to operate compiled code such as WEBASSEMBLY™ code, such as that sent from an interaction handler 112 when a URL is accessed that leads to a page generated by a transaction page generator 113. In this way, the user may use their mobile device to scan a displayed QR code, and finish their transaction without touching any other POS device aside from the banking card interaction. The finished transaction may then have funds transferred as per usual for a transaction with banking cards, with at least one, but potentially multiple financial institutions and accounts 140, 150. For instance, funds may be withdrawn from a user's account at one institution, and deposited into an account at another institution operated by the business.

Figure 2:
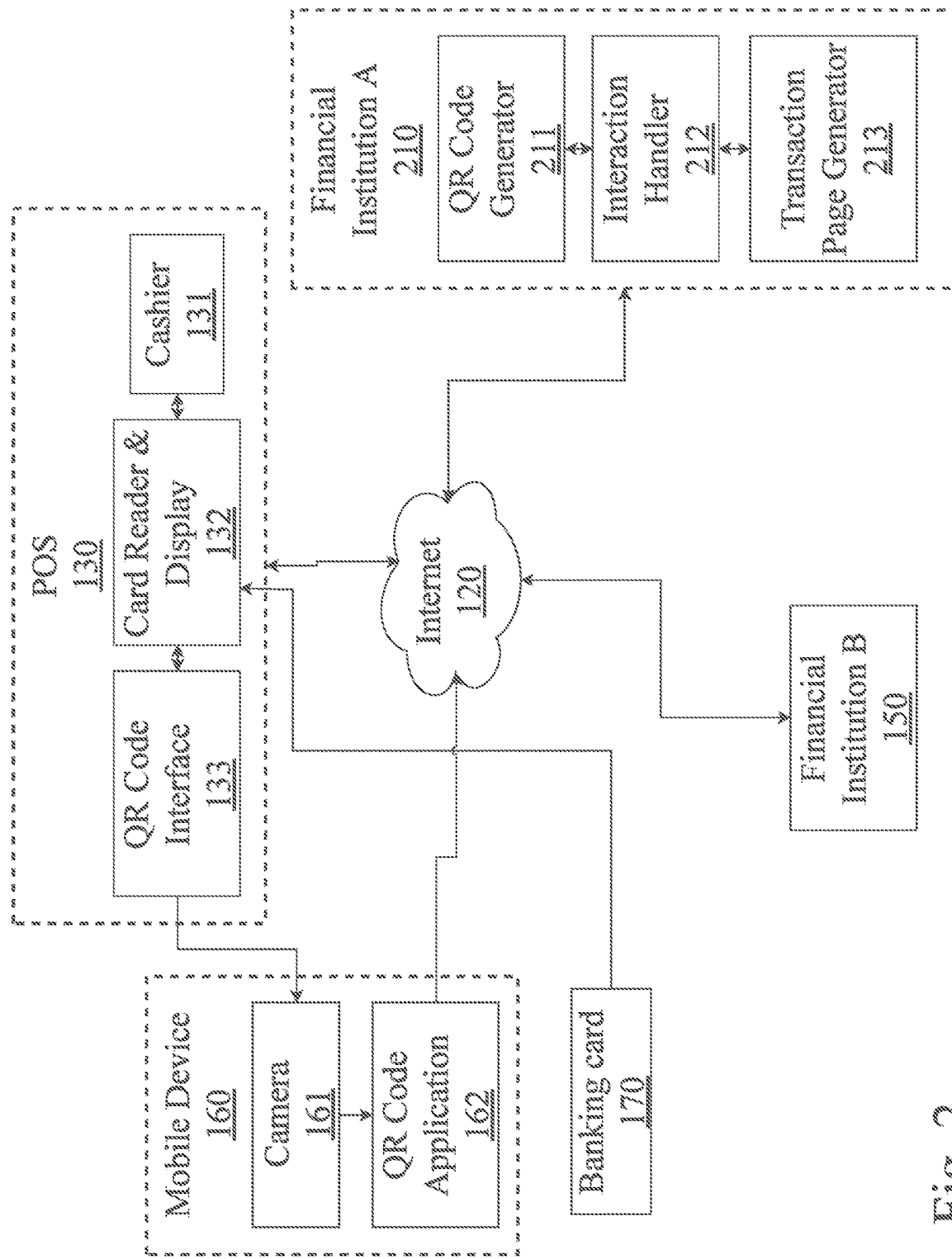
FIG. 2 is another block diagram illustrating an exemplary system architecture for minimal contact in-person business transactions using a banking card and mobile device, according to an alternative embodiment, where a financial institution operates the system.

FIG. 2 is another block diagram illustrating an exemplary system architecture for minimal contact in-person business transactions using a banking card and mobile device, according to an alternative embodiment, where a financial institution operates the system. A server or service operated by a financial institution 210 operates at least a QR code generator 211, interaction handler 212, and transaction page generator 213, which may be separate devices connected directly or over a network and interacting with a financial institution server or service 210, or may be software operating on a server itself, or software operating over a network and communicating over a network with the server. Such a server may be operating one of a variety of operating systems and server software including WINDOWS SERVER™, LINUX™ APACHE™, or other software. The financial institution server or servers 210 may also run other software or have other hardware components aside from only the QR code generator 211, interaction handler 212, and transaction page generator 213. A QR code generator 211 is a tool or set of tools for taking a certain Uniform Resource Locator ("URL") and encoding it as a QR code to be sent to requesting users. The URL encoded by the QR code generator 211 is a URL generated by a transaction page generator 213, the interactions between the two devices, and interactions with external services such as a third party POS 130, being handled by an interaction handler 212. A transaction page may be generated simply as an interactive web page such as one designed with JAVASCRIPT™ elements, or such as one compiled with WEBASSEMBLY™ technology, that allows a user to input data such as a tip amount, their signature, receipt preferences, email preferences, or other data, as applicable and determined by the POS 130, in order to complete a transaction. The internet 120 may be used to facilitate communications between several different devices or institutions or individuals, including a customer's mobile device 160, a business POS 130, a financial institution server or servers 210, and at least one but potentially multiple financial institutions 210, 150. A business' POS 130 may have components including a cashier module or display 131, a card reader and associated display 132, and a QR code interface 133. A cashier module or display 131 is the part of the system attended to by an actual cashier, and may be handled automatically as part of a self-checkout device or by a human such as in a supermarket. The card reader and display 132 is a device that allows at least the insertion of a banking card 170 from a customer and is capable of displaying images at least in the required resolution for a QR code to be displayed, which may be performed with a QR code interface 133 if no separate screen for the card reader is possible. For example, if a card reader is a small hand-held card reader without a moderate resolution digital display, a separate device for a QR code interface 133 may be present to display the QR code. In other instances, the QR code interface 133 may be merely a part of the card reader and display 132, a software component able to render the QR code on the screen. A banking card 170 may also be swiped or instead held nearby if it is RFID enabled or similar. Regardless of which implementation is used by a given POS 130, a customer must have not only their banking card 170 but also a mobile device 160 with a camera 161 and QR code application 162, such as a tablet computer or a smartphone. The QR code application 162 is software operating on the mobile device 160 that may use the camera 161 to identify and scan QR codes the camera is pointed to, and access the URL that they encode, along with possibly other features including interactive web page integration and the ability to operate compiled code such as WEBASSEMBLY™ code, such as that sent from an interaction handler 212 when a URL is accessed that leads to a page generated by a transaction page generator 213. In this way, the user may use their mobile device to scan a displayed QR code, and finish their transaction without touching any other POS device aside from the banking card interaction. The finished transaction may then have funds transferred as per usual for a transaction with banking cards, with at least one, but potentially multiple financial institutions and accounts 210, 150. For instance, funds may be withdrawn from a user's account at one institution, and deposited into an account at another institution operated by the business.

Figure 3:
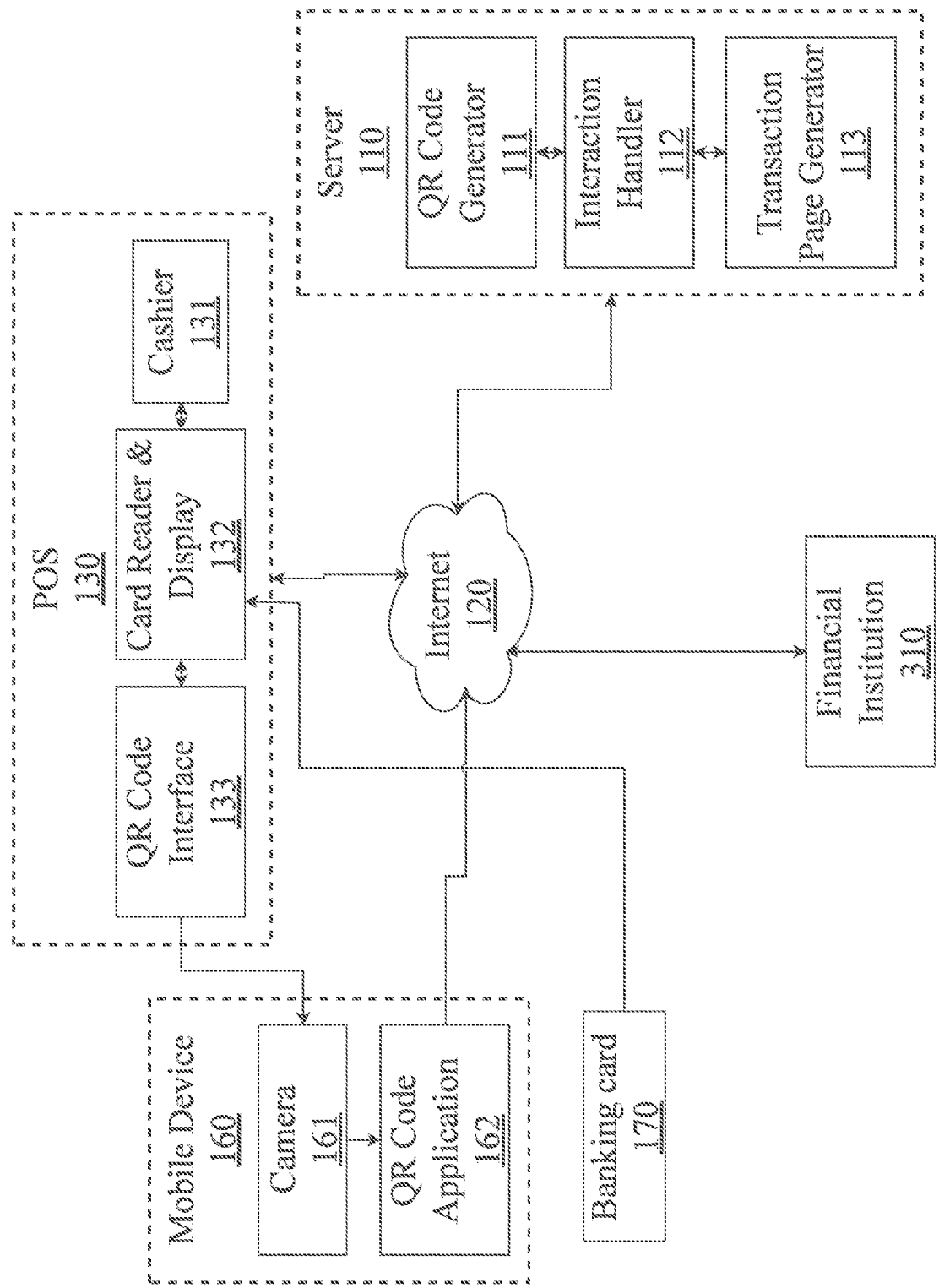
FIG. 3 is another block diagram illustrating an exemplary system architecture for minimal contact in-person business transactions using a banking card and mobile device, according to an alternative embodiment, where there is only one financial institution instead of a possible plurality of institutions.

FIG. 3 is another block diagram illustrating an exemplary system architecture for minimal contact in-person business transactions using a banking card and mobile device, according to an alternative embodiment, where there is only one financial institution instead of a possible plurality of institutions. A server 110 operates at least a QR code generator 111, interaction handler 112, and transaction page generator 113, which may be separate devices connected directly or over a network and interacting with a server 110, or may be software operating on the server 110 itself, or software operating over a network and communicating over a network with the server 110. Such a server may be operating one of a variety of operating systems and server software including WINDOWS SERVER™, LINUX™, APACHE™, or other software. The server 110 may also run other software or have other hardware components aside from only the QR code generator 111, interaction handler 112, and transaction page generator 113. A QR code generator 111 is a tool or set of tools for taking a certain Uniform Resource Locator ("URL") and encoding it as a QR code to be sent to requesting users. The URL encoded by the QR code generator 111 is a URL generated by a transaction page generator 113, the interactions between the two devices, and interactions with external services such as a third party POS 130, being handled by an interaction handler 112. A transaction page may be generated simply as an interactive web page such as one designed with JAVASCRIPT™ elements, or such as one compiled with WEBASSEMBLY™ technology, that allows a user to input data such as a tip amount, their signature, receipt preferences, email preferences, or other data, as applicable and determined by the POS 130, in order to complete a transaction. The internet 120 may be used to facilitate communications between several different devices or institutions or individuals, including a customer's mobile device 160, a business POS 130, a server 110, and one financial institution 310. A business' POS 130 may have components including a cashier module or display 131, a card reader and associated display 132, and a QR code interface 133. A cashier module or display 131 is the part of the system attended to by an actual cashier, and may be handled automatically as part of a self-checkout device or by a human such as in a supermarket. The card reader and display 132 is a device that allows at least the insertion of a banking card 170 from a customer and is capable of displaying images at least in the required resolution for a QR code to be displayed, which may be performed with a QR code interface 133 if no separate screen for the card reader is possible. For example, if a card reader is a small hand-held card reader without a moderate resolution digital display, a separate device for a QR code interface 133 may be present to display the QR code. In other instances, the QR code interface 133 may be merely a part of the card reader and display 132, a software component able to render the QR code on the screen. A banking card 170 may also be swiped or instead held nearby if it is RFID enabled or similar. Regardless of which implementation is used by a given POS 130, a customer must have not only their banking card 170 but also a mobile device 160 with a camera 161 and QR code application 162, such as a tablet computer or a smartphone. The QR code application 162 is software operating on the mobile device 160 that may use the camera 161 to identify and scan QR codes the camera is pointed to, and access the URL that they encode, along with possibly other features including interactive web page integration and the ability to operate compiled code such as WEBASSEMBLY™ code, such as that sent from an interaction handler 112 when a URL is accessed that leads to a page generated by a transaction page generator 113. In this way, the user may use their mobile device to scan a displayed QR code, and finish their transaction without touching any other POS device aside from the banking card interaction. The finished transaction may then have funds transferred as per usual for a transaction with banking cards, with at least one financial institution and account 310. For instance, a gift card may be used in which case only one financial institution might be utilized for completion of the transaction, or cash may be utilized for part or all of the transaction, or the customer and business may utilize accounts at the same financial institution, or a single institution might be contacted and then later the institution may have systems to withdraw funds from the customer's own financial institution.

Figure 10:
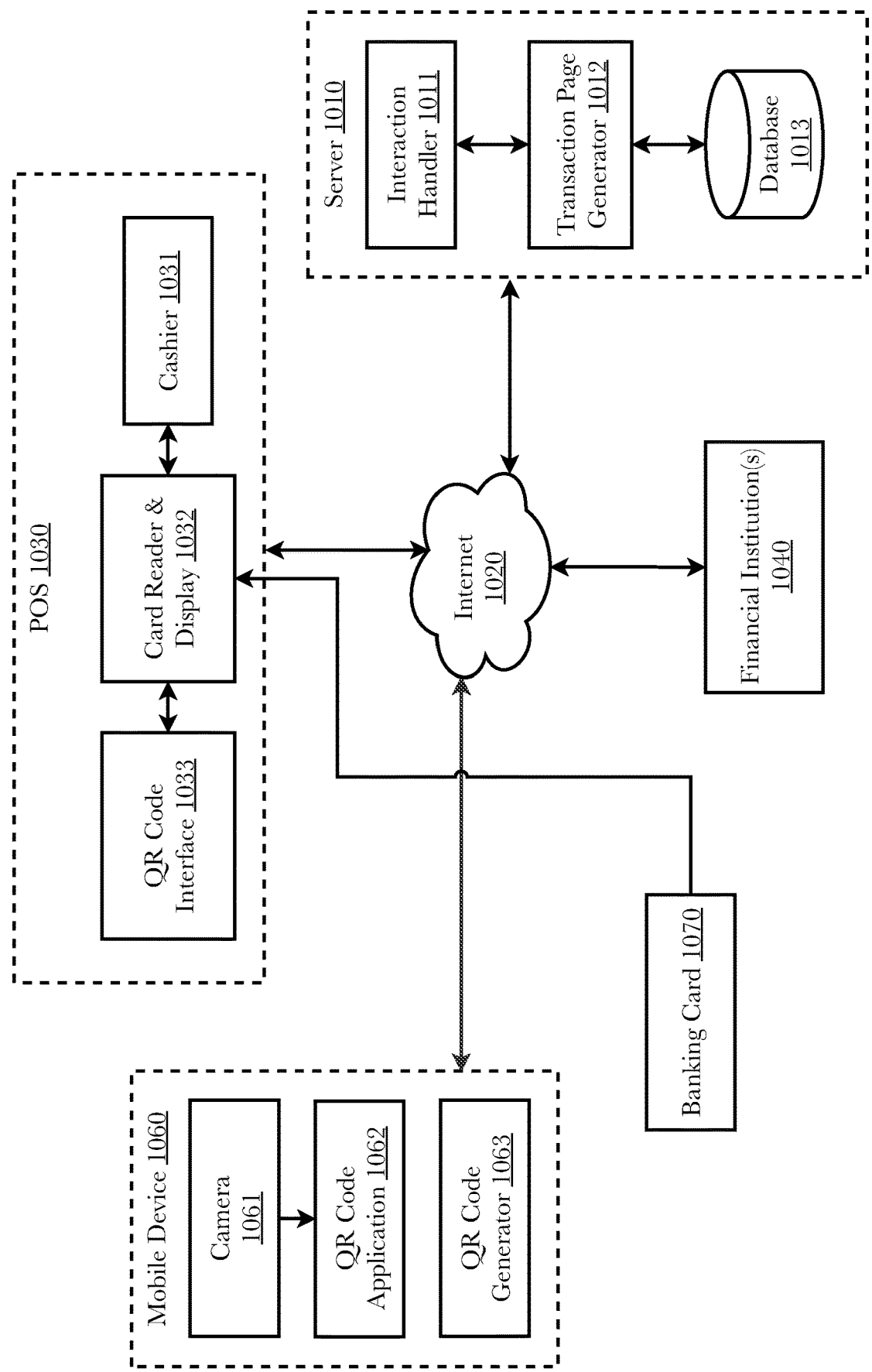
FIG. 10 is a block diagram illustrating an exemplary system architecture for minimal contact in-person order fulfillment using a mobile device, according to a preferred embodiment.

FIG. 10 is a block diagram illustrating an exemplary system architecture for minimal contact in-person order fulfillment using a mobile device, according to a preferred embodiment. A server 1010 operates at least an interaction handler 1011, transaction page generator 1012, and a database 1013 which may be separate devices connected directly or over a network and interacting with a server 1010, or may be software operating on the server 1010 itself, or software operating over a network and communicating over a network with the server 1010. Such a server may be operating one of a variety of operating systems and server software including WINDOWS SERVER™, LINUX™, APACHE™, or other software. The server 1010 may also run other software or have other hardware components aside from only the interaction handler 1011, transaction page generator 1012, and database 1013. Database 1013 may be present that can be configured to store various data such as customer information (e.g., an account handle and password, customer biometric data, historical customer purchase data, customer preferences, customer rebates, specials, or discounts, etc.) and business information (e.g., promotions, rebates, special offers, coupons, location data, business operations data such as hours of operation, phone number, business website and/or web-app, etc.). A QR code generator 1063 is a tool or set of tools for taking a customer's order (e.g., food order, goods and services order, etc.) and encoding it as a QR code to be sent to requesting POS 1030 users. The customer order encoded by the QR code generator 1063 may comprise a user identification, an order description (e.g., a food order comprising one or more food items), and payment details. The customer mobile device 1060 may display the QR code, wherein a POS 1030 may scan the QR code displayed on the mobile device and receive the customer's order with minimal contact. Upon scanning the QR code the POS 1030 may be configured request a transaction page from a transaction page generator 1012, the interactions between the two devices, and interactions with external services such as a third party POS 1030, being handled by an interaction handler 1012. A transaction page may be generated simply as an interactive web page such as one designed with JAVASCRIPT™ elements, or such as one compiled with WEBASSEMBLY™ technology, that allows a user to input data such as a tip amount, their signature, receipt preferences, email preferences, or other data, as applicable and determined by the POS 1030, in order to complete a transaction. Transaction page generator 1012 may be configured to generate a URL associated with the customer's transaction and then send the URL to the POS 1030 based on a POS 1030 transaction page request. Then POS 1030 may send the URL to the customer mobile device after scanning the displayed QR code. The internet 1020 may be used to facilitate communications between several different devices or institutions or individuals, including a customer's mobile device 1060, business POS 1030, server 1010, and at least one but potentially multiple financial institutions 1040. A business' POS 1030 may have components including a cashier module or display 1031, a card reader and associated display 1032, and a QR code interface 1033. A cashier module or display 1031 is the part of the system attended to by an actual cashier, and may be handled automatically as part of a self-checkout device or by a human such as in a supermarket. The card reader and display 1032 is a device that allows at least the insertion of a banking card 1070 from a customer and is capable of displaying images at least in the required resolution for a QR code to be displayed, which may be performed with a QR code interface 1033 if no separate screen for the card reader is possible. For example, if a card reader is a small hand-held card reader without a moderate resolution digital display, a separate device for a QR code interface 1033 may be present to display and/or scan the QR code. In other instances, the QR code interface 1033 may be merely a part of the card reader and display 1032, a software component able to render the QR code on the screen. A banking card 1070 may also be swiped or instead held nearby if it is RFID enabled or similar. Regardless of which implementation is used by a given POS 1030, a customer must have not only their banking card 1070 but also a mobile device 1060 with a camera 1061 and QR code application 1062, such as a tablet computer or a smartphone. The QR code application 1062 is software operating on the mobile device 1060 that may use the camera 1061 to identify and scan QR codes the camera is pointed to, and access the URL that they encode, along with possibly other features including interactive web page integration and the ability to operate compiled code such as WEBASSEMBLY™ code, such as that sent from an interaction handler 1011 when a URL is accessed that leads to a page generated by a transaction page generator 1012. In this way, the user may use their mobile device to initiate and assemble an order from a business, encode the order into a QR code, display the QR code, receive a URL from a POS 1030, and finish their transaction without touching any other POS device aside from the banking card interaction. The finished transaction may then have funds transferred as per usual for a transaction with banking cards, with at least one, but potentially multiple financial institutions and accounts 1040. For instance, funds may be withdrawn from a user's account at one institution, and deposited into an account at another institution operated by the business.

Detailed Description of Exemplary Aspects

Figure 4:
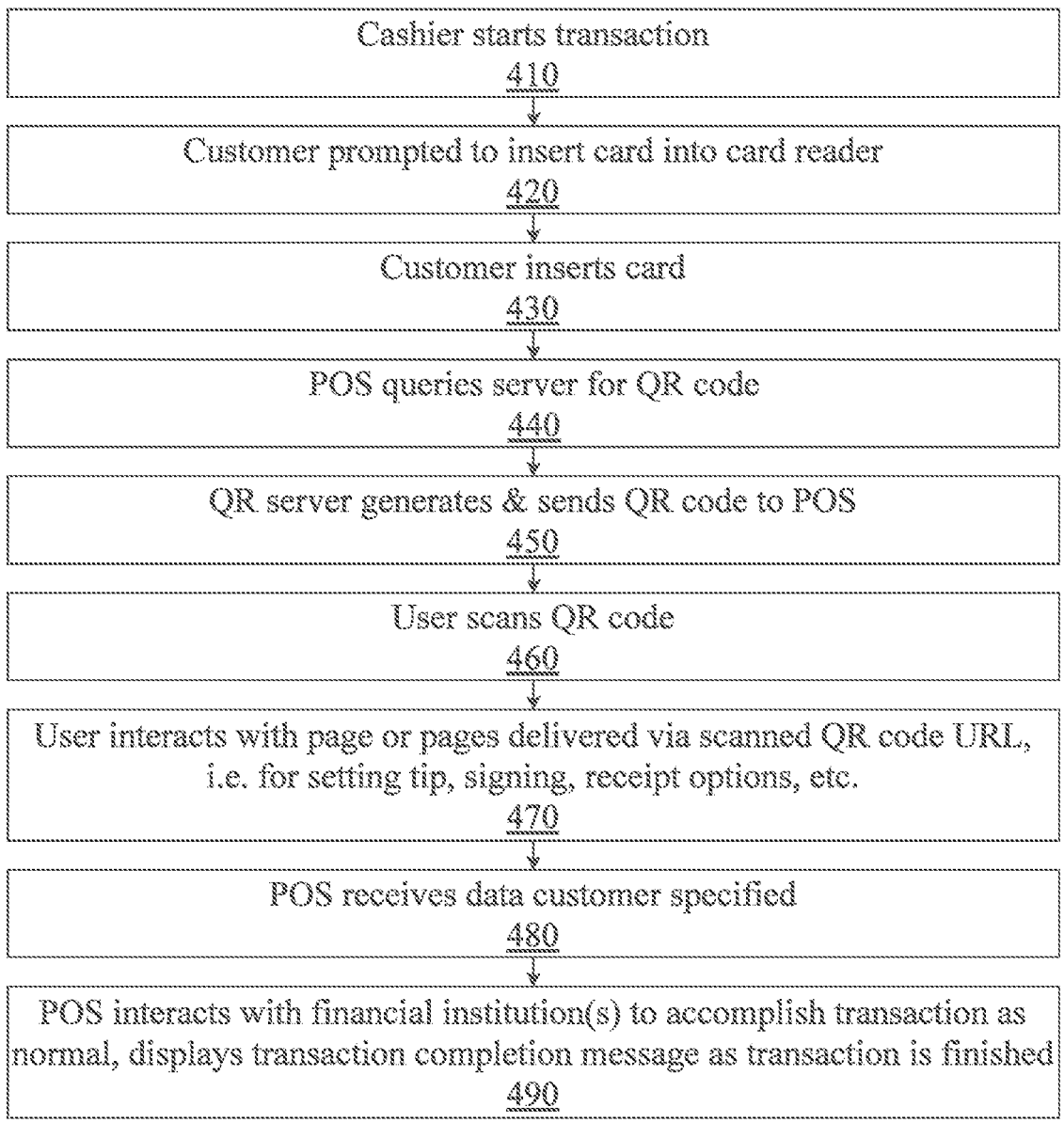
FIG. 4 is a method diagram illustrating the operation of a system for minimal contact in-person business transactions using a banking card and mobile device, according to one embodiment.

FIG. 4 is a method diagram illustrating the operation of a system for minimal contact in-person business transactions using a banking card and mobile device, according to one embodiment. A cashier may start a transaction 410 with a customer, such as ringing up a customer's goods at a supermarket such as WALMART™, SAFEWAY™, TARGET™, or others. Initiating a transaction may prompt a customer to use their card with a card reader 420, which may or may not have its own digital display, allowing a customer to insert or swipe or otherwise interact their banking card with the card reader 430. Such a banking card may be a credit card, debit card, prepaid card, gift card, or even a smart wallet application or similar such as APPLE PAY™. The point-of-sale system may then query a server for a QR code 440 with which to finish the transaction, over the internet. The QR server generates and sends the QR code to the POS 450 over the internet, the QR code containing a URL leading to an interactive web page such as one written in HTML and page scripting such as JAVASCRIPT™, or potentially a compiled page or application such as one built with WEBASSEMBLY™ technology. A customer may scan the QR code 460, at which point the customer may interact with the page or pages delivered via the scanned QR code's URL, for purposes such as setting a tip for the transaction, leaving feedback or responding to a survey, leaving the customer's signature, choosing receipt options such as via email or text message, signing up for extra services such as a membership for the business in question, or other possible options when finishing a transaction at a business 470. The POS then receives the data specified by the customer 480, and is able to complete the transaction, at which point the POS may interact with at least one financial institution to accomplish the transaction as normal 490, such as withdrawing or transferring funds from the customer to the business account. A transaction completion message may be displayed, indicating to the cashier or other worker that the transaction has finalized. The financial institution may be the one to operate the server or servers used for generating the QR code and supplying the interactive web page data, or it may be operated independently. Page data may be generated in differing compositions for each POS or each business depending on the business' choices when registering for the use of this service. For instance, a business may sign up for usage of this server with their POS systems, and enable only signature and receipt options for their web pages, in which case customers, when checking out from this business' POS, would only receive a web page with signature and receipt options and interaction capabilities.

Figure 5:
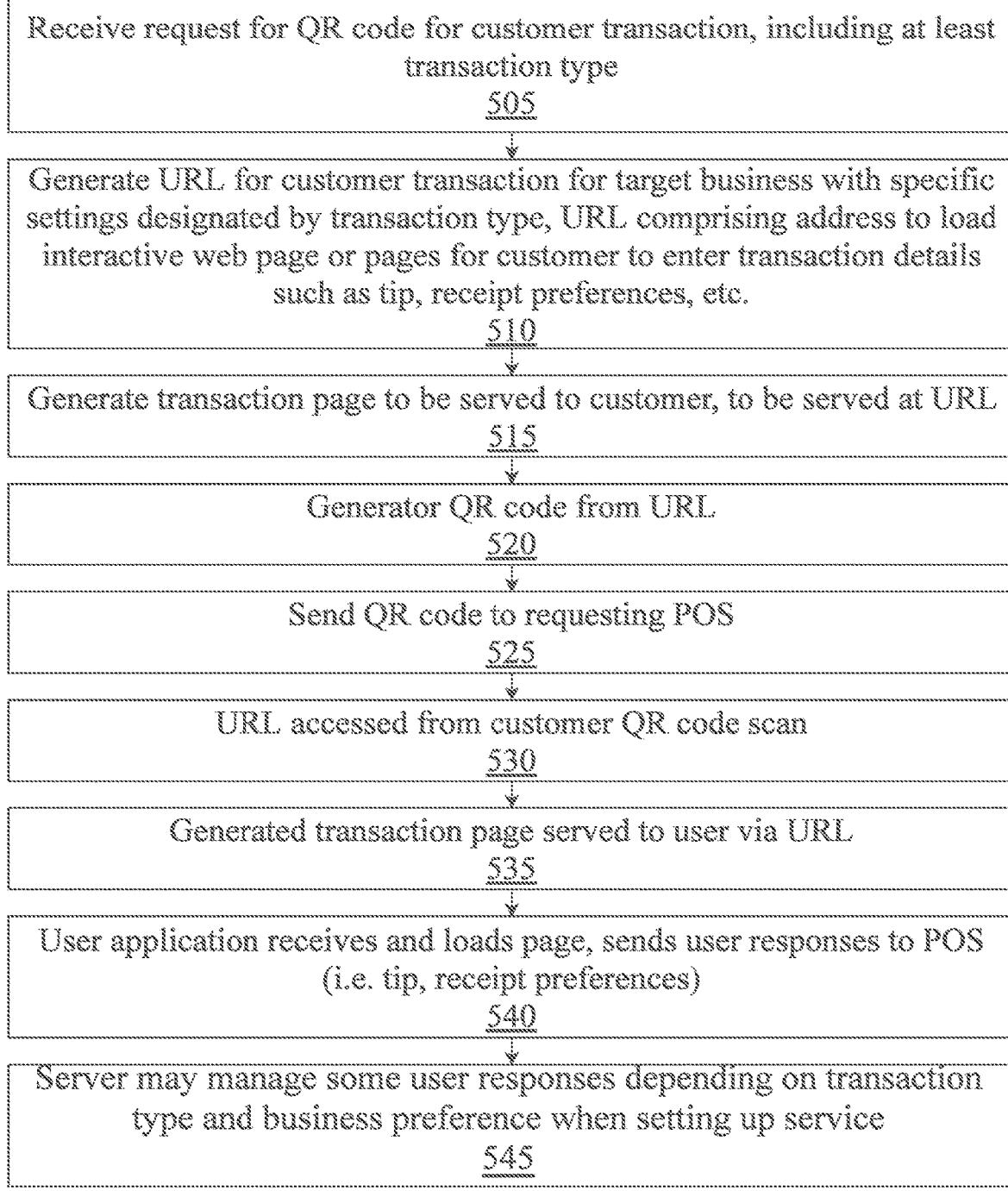
FIG. 5 is a method diagram illustrating the operation of a QR code server, according to an embodiment.

FIG. 5 is a method diagram illustrating the operation of a QR code server, according to an embodiment. A server may receive a request over the internet for a QR code for aiding in or handling a customer transaction, the request including at least the transaction type or identity of the POS or business making the request 505. For instance, a request may take the form of an encrypted or otherwise secured JSON string placed in an HTTP request, where the JSON string contained the name of the business such as "Businessplace LLC" and a transaction ID or business ID such as "12345654321", so that the QR code server can identify properly what manner of transaction page should be served in response. After receiving such a request, the server may generate a URL for the customer transaction with the target business, with specific settings designated by the transaction type and/or business' ID, the URL comprising at least the address to load interactive web page or pages for customer to enter transaction details such as tip, receipt preferences, etc. 510. The URL is not served by itself however, and first the server may generate a transaction page to be served to the customer, via the URL 515, if such a page is not already generated. The page is then reachable at the specified URL, and the server generates a QR code from the URL 520, before sending the QR code to the requesting POS 525, to be eventually served to the customer in some way, such as displayed on a card reader display. The URL may then be accessed from customer scanning the QR code 530, which may be done with a specialized application on a mobile device, or may be done with a general QR code scanning application that may be designed to simply scan QR codes and access the URLs scanned, many of which are frequently available on app stores and similar. In response to scanning the QR code and opening the URL, the generated transaction page is served to the customer 535, at which point a user application running on their mobile device and used to scan the QR code receives and loads the page, and after user interactions, sends the user interactions to the POS (i.e. tip, receipt preferences) 540. This may be accomplished either by directly connecting to the POS such as with near-field communications or RFID, or an internet tether negotiated by the server, or the server may manage some or all of the user responses and forward the data to the POS rather than the POS receiving the data directly from the user's mobile device 545.

Figure 6:
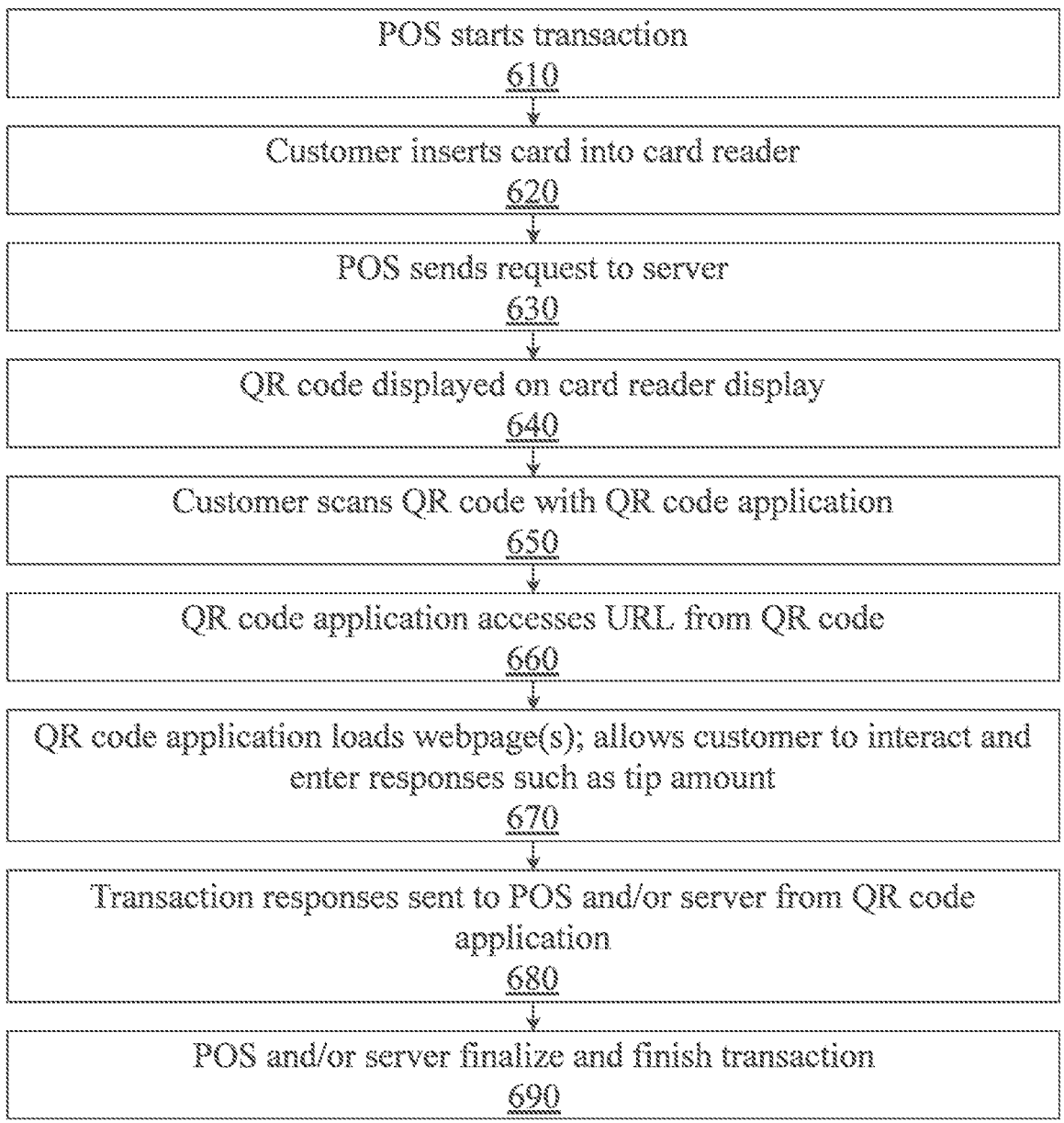
FIG. 6 is a method diagram illustrating the operation of a QR code application and a business POS serving QR codes to a customer, according to an embodiment.

FIG. 6 is a method diagram illustrating the operation of a QR code application and a business POS serving QR codes to a customer, according to an embodiment. The POS may first start the transaction 610, whether by a cashier manually starting the transaction or by a self-service POS such as an automated checkout station beginning it with the customer. A customer may insert their card into card reader 620, although swiping, waving nearby, or otherwise utilizing card-based or digital payment methods such as APPLE PAY™ may also be done, at which point the POS may send a request to a QR code server 630. After receiving a QR code from such a server, the QR code may be displayed on a card reader display 640, which may be a separate display from a self-service or cashier display, or may be the same display, allowing a customer to scan the displayed QR code with a QR code application 650 operating on a mobile device controlled by the customer. The QR code application then accesses the encoded URL from the scanned QR code 660, allowing the QR code application to load an interactive webpage or pages, or download compiled code that is able to operate on the mobile device, allowing the customer to interact with the page or pages and enter responses to queries, such as a tip amount or signature 670. The transaction responses are then sent to the POS, either directly or through the QR server from the QR code application operating the interactive page or pages 680, allowing the POS to finalize and finish the transaction 690, which may require the use of the QR code server if the server is utilized in processing and forwarding data from the page or pages used by the customer, to the POS.

Figure 7:
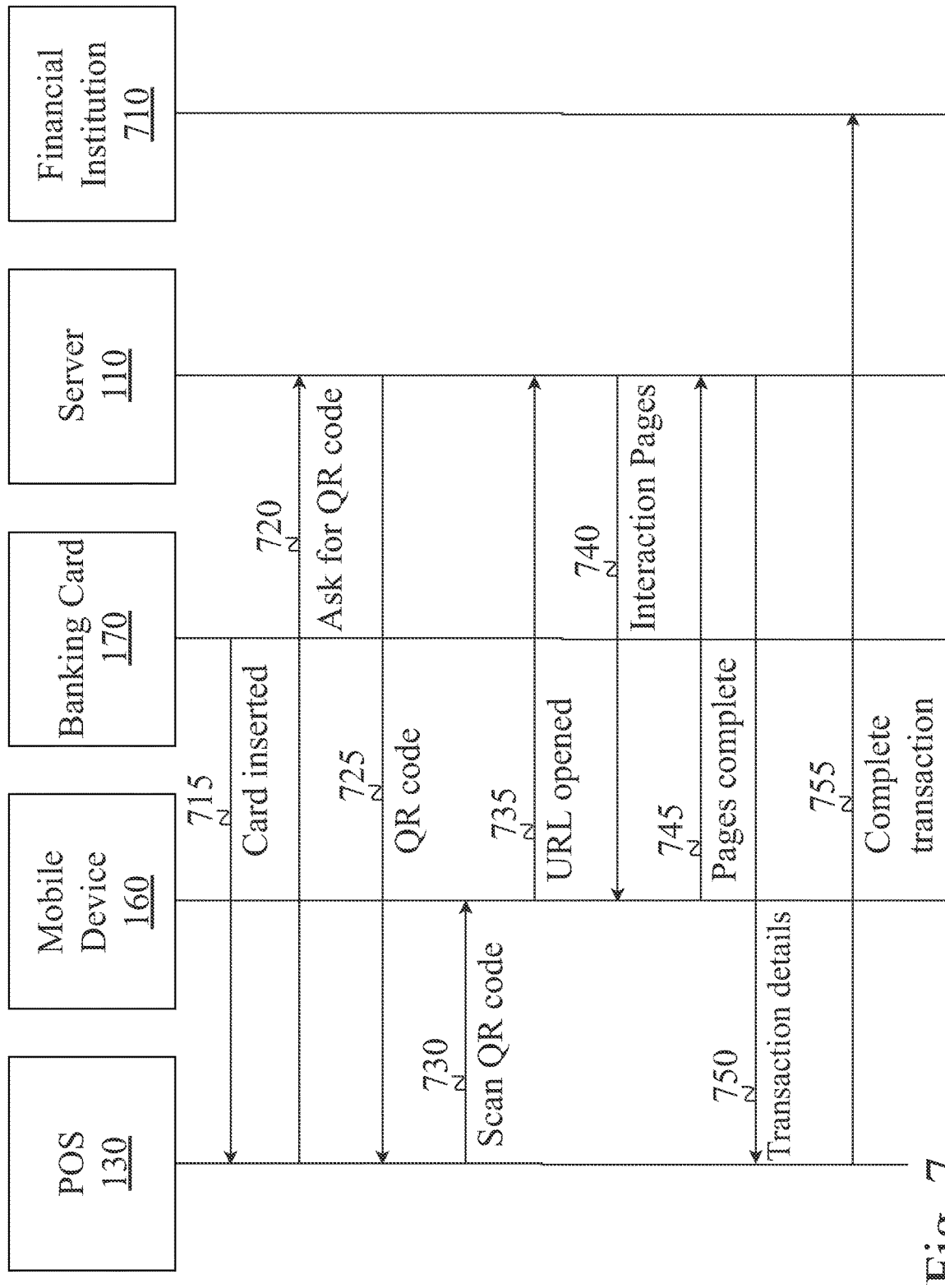
FIG. 7 is a message flow diagram illustrating the operation of a system for minimal contact in-person business transactions using a banking card and mobile device, according to one embodiment.

FIG. 7 is a message flow diagram illustrating the operation of a system for minimal contact in-person business transactions using a banking card and mobile device, according to one embodiment. A server 110 operates at least a QR code generator, interaction handler, and transaction page generator, which may be separate devices connected directly or over a network and interacting with a server 110, or may be software operating on the server 110 itself, or software operating over a network and communicating over a network with the server 110. Such a server may be operating one of a variety of operating systems and server software including WINDOWS SERVER™, LINUX™, APACHE™, or other software. The server 110 may also run other software or have other hardware components aside from only the QR code generator, interaction handler, and transaction page generator. A QR code generator is a tool or set of tools for taking a certain Uniform Resource Locator ("URL") and encoding it as a QR code to be sent to requesting users. The URL encoded by the QR code generator is a URL generated by a transaction page generator, the interactions between the two devices, and interactions with external services such as a third party POS 130, being handled by an interaction handler. A transaction page may be generated simply as an interactive web page such as one designed with JAVASCRIPT™ elements, or such as one compiled with WEBASSEMBLY™ technology, that allows a user to input data such as a tip amount, their signature, receipt preferences, email preferences, or other data, as applicable and determined by the POS 130, in order to complete a transaction. The internet may be used to facilitate communications between several different devices or institutions or individuals 710, including a customer's mobile device 160, a business POS 130, a server 110, and at least one but potentially multiple financial institutions 710. A business' POS 130 may have components including a cashier module or display, a card reader and associated display, and a QR code interface. A cashier module or display is the part of the system attended to by an actual cashier, and may be handled automatically as part of a self-checkout device or by a human such as in a supermarket. The card reader and display is a device that allows at least the insertion of a banking card 170 from a customer and is capable of displaying images at least in the required resolution for a QR code to be displayed, which may be performed with a QR code interface if no separate screen for the card reader is possible. For example, if a card reader is a small hand-held card reader without a moderate resolution digital display, a separate device for a QR code interface may be present to display the QR code. In other instances, the QR code interface may be merely a part of the card reader and display, a software component able to render the QR code on the screen. A banking card 170 may also be swiped or instead held nearby if it is RFID enabled or similar. Regardless of which implementation is used by a given POS 130, a customer must have not only their banking card 170 but also a mobile device 160 with a camera and QR code application, such as a tablet computer or a smartphone. The QR code application is software operating on the mobile device 160 that may use the camera to identify and scan QR codes the camera is pointed to, and access the URL that they encode, along with possibly other features including interactive web page integration and the ability to operate compiled code such as WEBASSEMBLY™ code, such as that sent from an interaction handler when a URL is accessed that leads to a page generated by a transaction page generator. In this way, the user may use their mobile device to scan a displayed QR code, and finish their transaction without touching any other POS device aside from the banking card interaction. The finished transaction may then have funds transferred as per usual for a transaction with banking cards, with at least one, but potentially multiple financial institutions and accounts 710. For instance, funds may be withdrawn from a user's account at one institution, and deposited into an account at another institution operated by the business. A cashier may start a transaction with a customer, such as ringing up a customer's goods at a supermarket such as WALMART™, SAFEWAY™, TARGET™, or others. Initiating a transaction may prompt a customer to use their card with a card reader, which may or may not have its own digital display, allowing a customer to insert or swipe or otherwise interact their banking card with the card reader 715. Such a banking card may be a credit card, debit card, prepaid card, gift card, or even a smart wallet application or similar such as APPLE PAY™. The point-of-sale system may then query a server for a QR code with which to finish the transaction 720, over the internet. The QR server generates and sends the QR code to the POS over the internet 725, the QR code containing a URL leading to an interactive web page such as one written in HTML and page scripting such as JAVASCRIPT™, or potentially a compiled page or application such as one built with WEBASSEMBLY™ technology. A customer may scan the QR code 730, at which point the customer may interact with the page or pages delivered via the scanned QR code's URL 735, 740, for purposes such as setting a tip for the transaction, leaving feedback or responding to a survey, leaving the customer's signature, choosing receipt options such as via email or text message, signing up for extra services such as a membership for the business in question, or other possible options when finishing a transaction at a business. The completed page data with user interactions and responses is then sent back to the server 745. The POS then receives the relevant transaction data specified by the customer 750, and is able to complete the transaction, at which point the POS may interact with at least one financial institution to accomplish the transaction as normal, such as withdrawing or transferring funds from the customer to the business account 755. The financial institution may be the one to operate the server or servers used for generating the QR code and supplying the interactive web page data, or it may be operated independently. Page data may be generated in differing compositions for each POS or each business depending on the business' choices when registering for the use of this service. For instance, a business may sign up for usage of this server with their POS systems, and enable only signature and receipt options for their web pages, in which case customers, when checking out from this business' POS, would only receive a web page with signature and receipt options and interaction capabilities.

Figure 8:
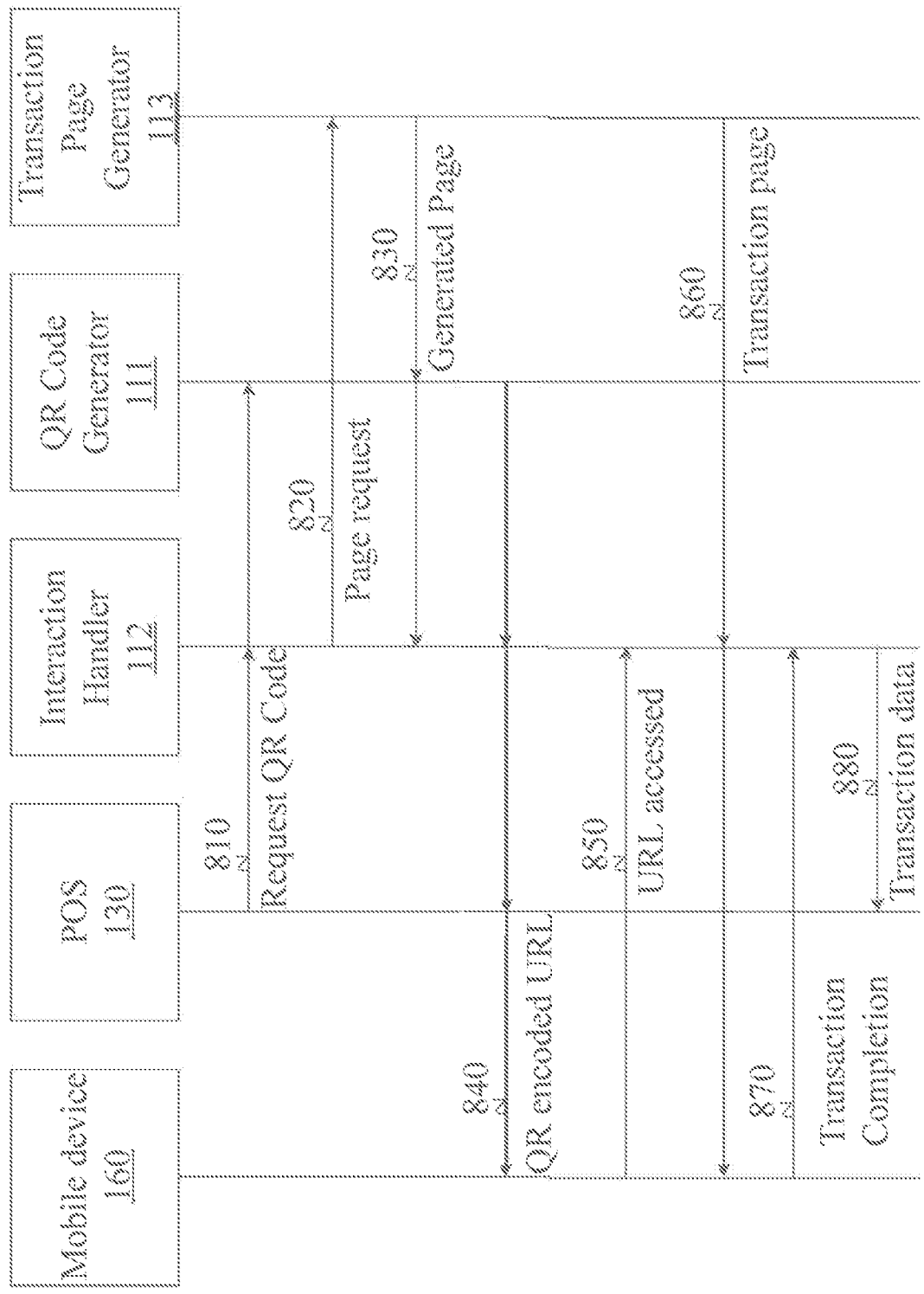
FIG. 8 is a message flow diagram illustrating the operation of a QR code server, according to an embodiment.

FIG. 8 is a message flow diagram illustrating the operation of a QR code server, according to an embodiment. A server operates at least a QR code generator 111, interaction handler 112, and transaction page generator 113, which may be separate devices connected directly or over a network and interacting with a server, or may be software operating on the server itself, or software operating over a network and communicating over a network with the server. Such a server may be operating one of a variety of operating systems and server software including WINDOWS SERVER™, LINUX™, APACHE™, or other software. The server may also run other software or have other hardware components aside from only the QR code generator 111, interaction handler 112, and transaction page generator 113. A QR code generator 111 is a tool or set of tools for taking a certain Uniform Resource Locator ("URL") and encoding it as a QR code to be sent to requesting users. The URL encoded by the QR code generator 111 is a URL generated by a transaction page generator 113, the interactions between the two devices, and interactions with external services such as a third party POS 130, being handled by an interaction handler 112. A transaction page may be generated simply as an interactive web page such as one designed with JAVASCRIPT™ elements, or such as one compiled with WEBASSEMBLY™ technology, that allows a user to input data such as a tip amount, their signature, receipt preferences, email preferences, or other data, as applicable and determined by the POS 130, in order to complete a transaction. The internet may be used to facilitate communications between several different devices or institutions or individuals, including a customer's mobile device 160, a business POS 130, a server, and at least one but potentially multiple financial institutions. A business' POS 130 may have components including a cashier module or display, a card reader and associated display, and a QR code interface. A cashier module or display is the part of the system attended to by an actual cashier, and may be handled automatically as part of a self-checkout device or by a human such as in a supermarket. The card reader and display is a device that allows at least the insertion of a banking card from a customer and is capable of displaying images at least in the required resolution for a QR code to be displayed, which may be performed with a QR code interface if no separate screen for the card reader is possible. For example, if a card reader is a small hand-held card reader without a moderate resolution digital display, a separate device for a QR code interface may be present to display the QR code. In other instances, the QR code interface may be merely a part of the card reader and display, a software component able to render the QR code on the screen. A banking card may also be swiped or instead held nearby if it is RFID enabled or similar. Regardless of which implementation is used by a given POS 130, a customer must have not only their banking card but also a mobile device 160 with a camera and QR code application, such as a tablet computer or a smartphone. The QR code application is software operating on the mobile device 160 that may use the camera to identify and scan QR codes the camera is pointed to, and access the URL that they encode, along with possibly other features including interactive web page integration and the ability to operate compiled code such as WEBASSEMBLY™ code, such as that sent from an interaction handler 112 when a URL is accessed that leads to a page generated by a transaction page generator 113. In this way, the user may use their mobile device to scan a displayed QR code, and finish their transaction without touching any other POS device aside from the banking card interaction. The finished transaction may then have funds transferred as per usual for a transaction with banking cards, with at least one, but potentially multiple financial institutions and accounts. For instance, funds may be withdrawn from a user's account at one institution, and deposited into an account at another institution operated by the business. A server may receive a request over the internet for a QR code for aiding in or handling a customer transaction 810, the request including at least the transaction type or identity of the POS or business making the request. For instance, a request may take the form of an encrypted or otherwise secured JSON string placed in an HTTP request, where the JSON string contained the name of the business such as "Businessplace LLC" and a transaction ID or business ID such as "12345654321", so that the QR code server can identify properly what manner of transaction page should be served in response. After receiving such a request 820, the server may generate a URL for the customer transaction with the target business 830, with specific settings designated by the transaction type and/or business' ID, the URL comprising at least the address to load interactive web page or pages for customer to enter transaction details such as tip, receipt preferences, etc. The URL is not served by itself however, and first the server may generate a transaction page to be served to the customer, via the URL, if such a page is not already generated. The page is then reachable at the specified URL, and the server generates a QR code from the URL, before sending the QR code to the requesting POS 840, to be eventually served to the customer in some way, such as displayed on a card reader display. The URL may then be accessed from customer scanning the QR code 840, which may be done with a specialized application on a mobile device, or may be done with a general QR code scanning application that may be designed to simply scan QR codes and access the URLs scanned 850, many of which are frequently available on app stores and similar. In response to scanning the QR code and opening the URL 850, the generated transaction page is served to the customer 860, at which point a user application running on their mobile device and used to scan the QR code receives and loads the page, and after user interactions 870, sends the user interactions to the POS (i.e. tip, receipt preferences) 880. This may be accomplished either by directly connecting to the POS such as with near-field communications or RFID, or an internet tether negotiated by the server, or the server may manage some or all of the user responses and forward the data to the POS rather than the POS receiving the data directly from the user's mobile device.

Figure 9:
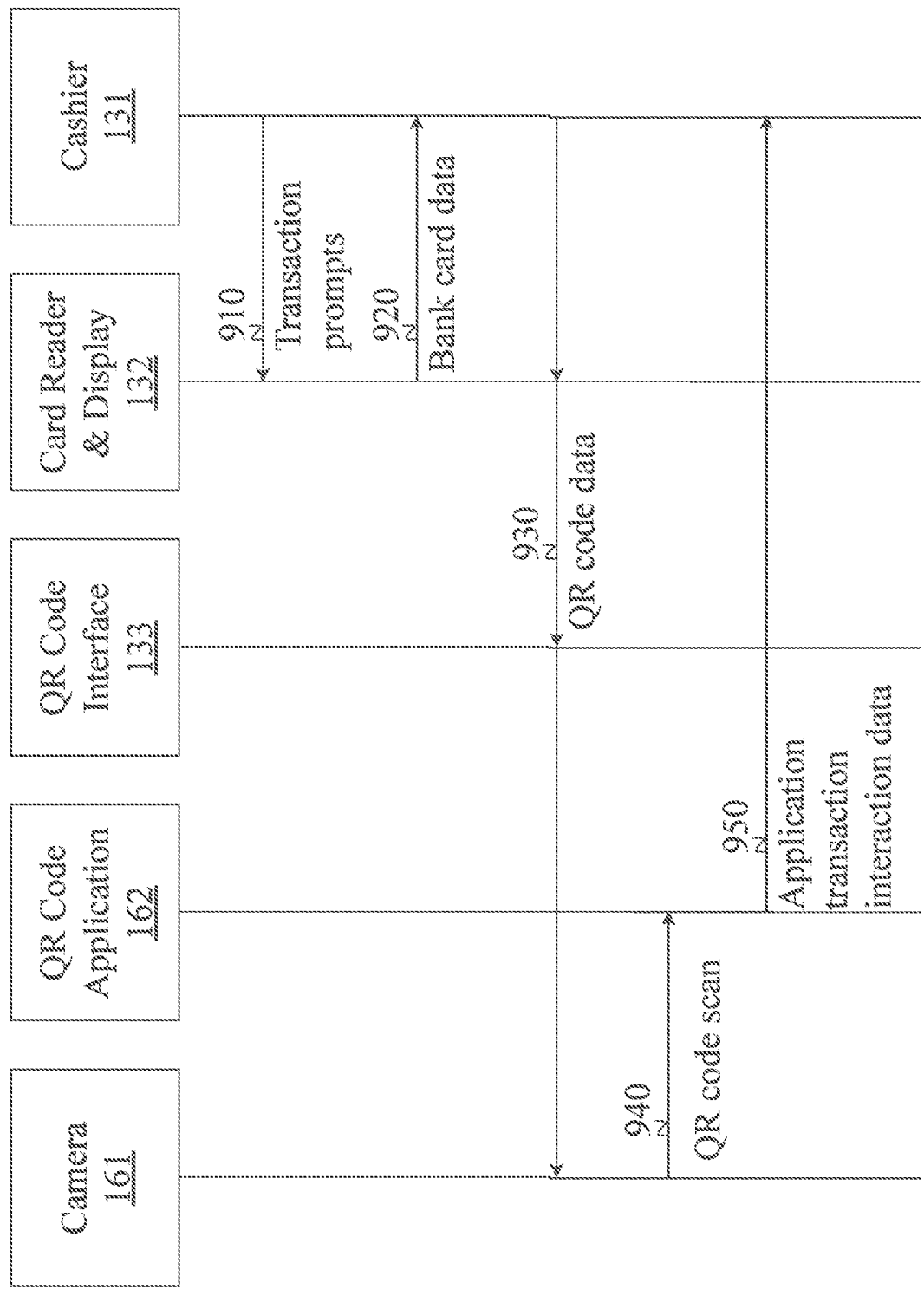
FIG. 9 is a message flow diagram illustrating the operation of a QR code application and a business POS serving QR codes to a customer, according to an embodiment.

FIG. 9 is a message flow diagram illustrating the operation of a QR code application and a business POS serving QR codes to a customer, according to an embodiment. A server operates at least a QR code generator, interaction handler, and transaction page generator, which may be separate devices connected directly or over a network and interacting with a server, or may be software operating on the server itself, or software operating over a network and communicating over a network with the server. Such a server may be operating one of a variety of operating systems and server software including WINDOWS SERVER™, LINUX™, APACHE™, or other software. The server may also run other software or have other hardware components aside from only the QR code generator, interaction handler, and transaction page generator. A QR code generator is a tool or set of tools for taking a certain Uniform Resource Locator ("URL") and encoding it as a QR code to be sent to requesting users. The URL encoded by the QR code generator is a URL generated by a transaction page generator, the interactions between the two devices, and interactions with external services such as a third party POS, being handled by an interaction handler. A transaction page may be generated simply as an interactive web page such as one designed with JAVASCRIPT™ elements, or such as one compiled with WEBASSEMBLY™ technology, that allows a user to input data such as a tip amount, their signature, receipt preferences, email preferences, or other data, as applicable and determined by the POS, in order to complete a transaction. The internet may be used to facilitate communications between several different devices or institutions or individuals, including a customer's mobile device, a business POS, a server, and at least one but potentially multiple financial institutions. A business' POS may have components including a cashier module or display 131, a card reader and associated display 132, and a QR code interface 133. A cashier module or display 131 is the part of the system attended to by an actual cashier, and may be handled automatically as part of a self-checkout device or by a human such as in a supermarket. The card reader and display 132 is a device that allows at least the insertion of a banking card from a customer and is capable of displaying images at least in the required resolution for a QR code to be displayed, which may be performed with a QR code interface 133 if no separate screen for the card reader is possible. For example, if a card reader is a small hand-held card reader without a moderate resolution digital display, a separate device for a QR code interface 133 may be present to display the QR code. In other instances, the QR code interface 133 may be merely a part of the card reader and display 132, a software component able to render the QR code on the screen. A banking card may also be swiped or instead held nearby if it is RFID enabled or similar. Regardless of which implementation is used by a given POS, a customer must have not only their banking card but also a mobile device with a camera 161 and QR code application 162, such as a tablet computer or a smartphone. The QR code application 162 is software operating on the mobile device that may use the camera 161 to identify and scan QR codes the camera is pointed to, and access the URL that they encode, along with possibly other features including interactive web page integration and the ability to operate compiled code such as WEBASSEMBLY™ code, such as that sent from an interaction handler when a URL is accessed that leads to a page generated by a transaction page generator. In this way, the user may use their mobile device to scan a displayed QR code, and finish their transaction without touching any other POS device aside from the banking card interaction. The finished transaction may then have funds transferred as per usual for a transaction with banking cards, with at least one, but potentially multiple financial institutions and accounts. For instance, funds may be withdrawn from a user's account at one institution, and deposited into an account at another institution operated by the business. The POS may first start the transaction, whether by a cashier manually starting the transaction or by a self-service POS such as an automated checkout station beginning it with the customer 910. A customer may insert their card into card reader, although swiping, waving nearby, or otherwise utilizing card-based or digital payment methods such as APPLE PAY™ may also be done 920, at which point the POS may send a request to a QR code server. After receiving a QR code from such a server, the QR code may be displayed on a card reader display, which may be a separate display from a self-service or cashier display, or may be the same display, allowing a customer to scan the displayed QR code 930 with a QR code application operating on a mobile device controlled by the customer 940. The QR code application then accesses the encoded URL from the scanned QR code, allowing the QR code application to load an interactive webpage or pages, or download compiled code that is able to operate on the mobile device, allowing the customer to interact with the page or pages and enter responses to queries, such as a tip amount or signature. The transaction responses are then sent to the POS 950, either directly or through the QR server from the QR code application operating the interactive page or pages, allowing the POS to finalize and finish the transaction, which may require the use of the QR code server if the server is utilized in processing and forwarding data from the page or pages used by the customer, to the POS.

Figure 11:
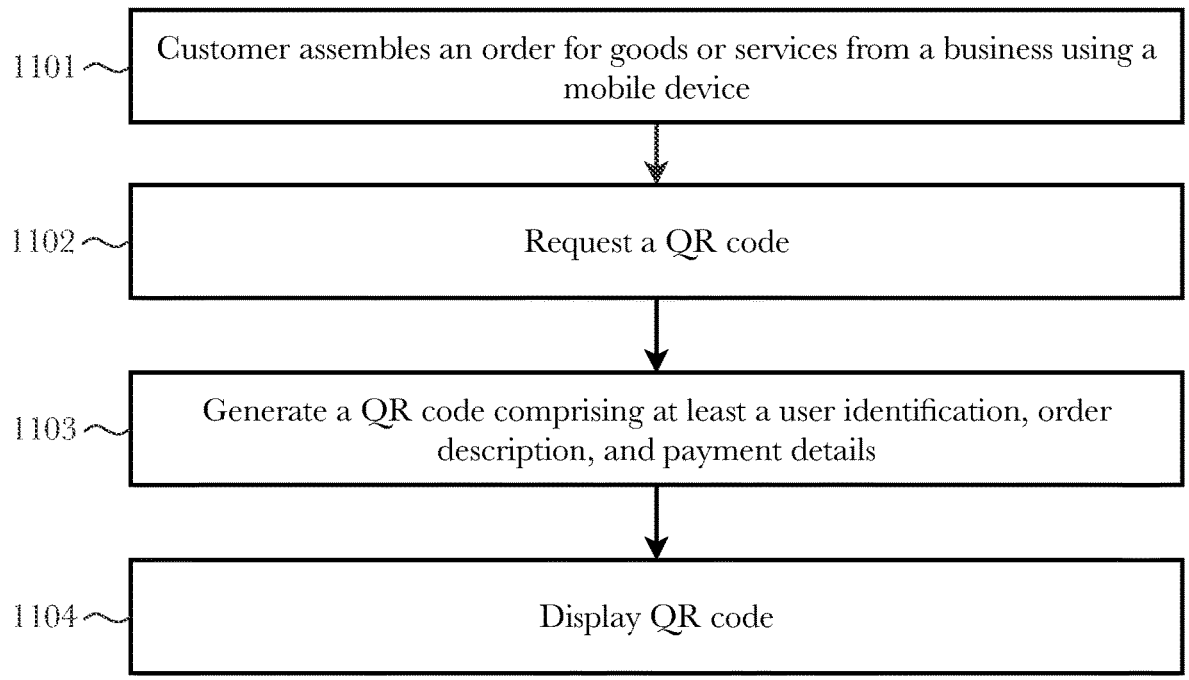
FIG. 11 is a flow diagram illustrating an exemplary method for encoding a customer's order into a QR code using a mobile device.

FIG. 11 is a flow diagram illustrating an exemplary method for encoding a customer's order into a QR code using a mobile device. According to some embodiments, the process begins at step 1101 when a customer uses their mobile device to assemble an order for goods or services from a business establishment. When the customer has completed assembling their order and confirmed it, a request for a QR code from a QR code generator operating on the customer's mobile device is sent to QR code generator at step 1102. At the QR code generator, a QR code is generated that encodes the customer's order, the QR may comprise at least a user identification, an order description, and payment details at step 1103. As a last step 1104, the generated QR code can be displayed on the customer's mobile device where it may scanned by any appropriate QR code scanner.

Figure 12:
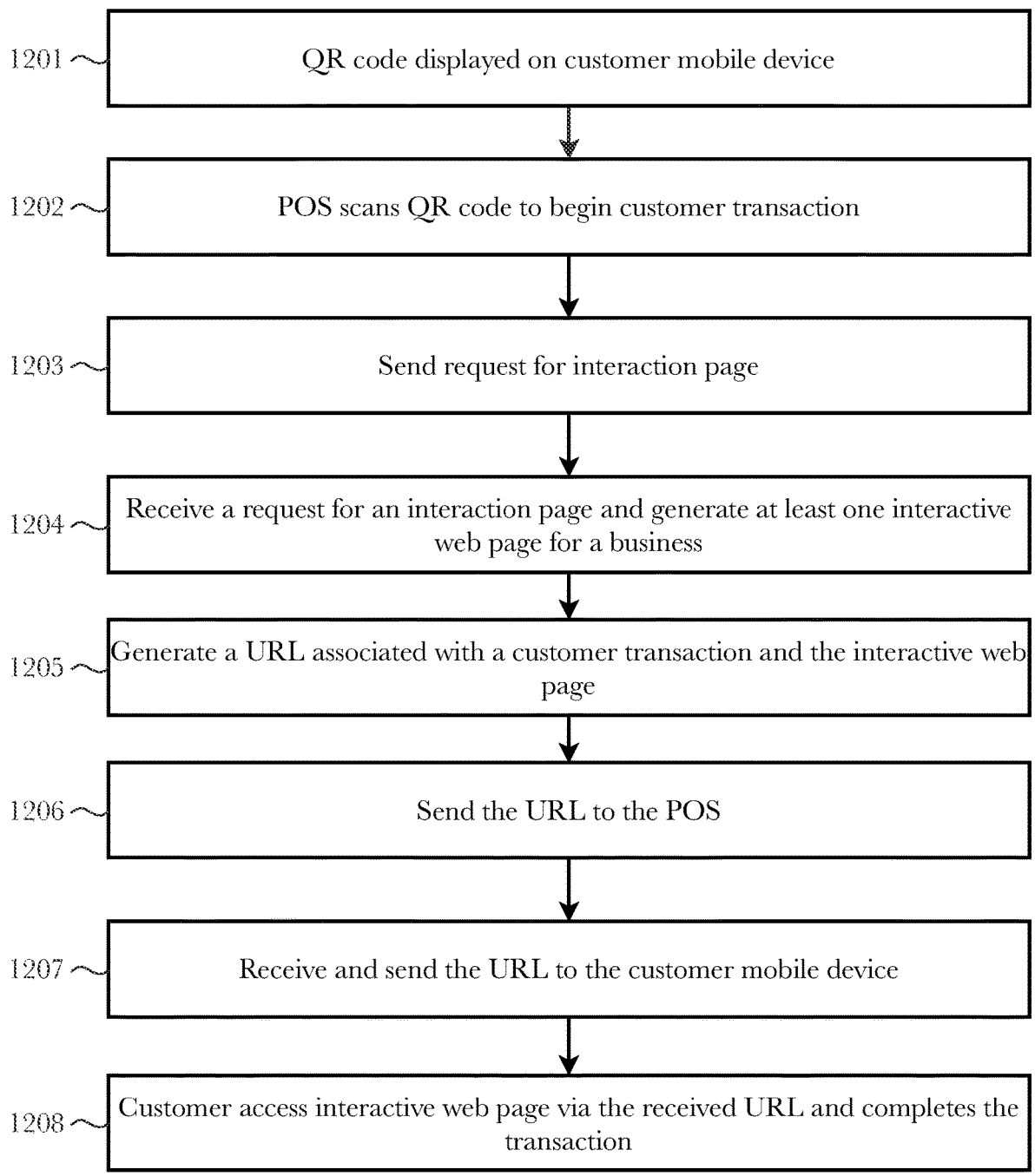
FIG. 12 is a flow diagram illustrating an exemplary method for conducting minimum contact order fulfillment using a mobile device and QR codes.

FIG. 12 is a flow diagram illustrating an exemplary method for conducting minimum contact order fulfillment using a mobile device and QR codes. According to some embodiments, the process begins 1201 when a customer arrives at a business and has a QR code displayed on their mobile device. In other embodiments, the customer may send the QR code to the business prior to the customer arriving at the business establishment and may be sent via email, text message, or other such services. As a next step 1202, a POS at the business scans the QR code displayed on the customer mobile device to begin a customer transaction. Upon scanning the QR code, the POS may send a request for an interaction page to an interaction page generator at step 1203. At step 1204, the transaction page generator receives the request for a transaction page and generates at least one interactive web page for a business. The next step 1205 as performed by transaction page generator is to generate a URL associated with a customer transaction and the interactive web page. The generated URL may be sent back to the POS responsive to the interaction page request at step 1206. As a next step 1207, the POS receives the URL and then sends the URL to the customer mobile device. As a last step 1208, the customer receives the URL at their mobile device and uses the URL to access the interactive web page to complete the transaction.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the aspects disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific aspects, at least some of the features or functionalities of the various aspects disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some aspects, at least some of the features or functionalities of the various aspects disclosed herein may be implemented in one or more virtualized computing environments (e.g., network computing clouds, virtual machines hosted on one or more physical computing machines, or other appropriate virtual environments).

Figure 13:
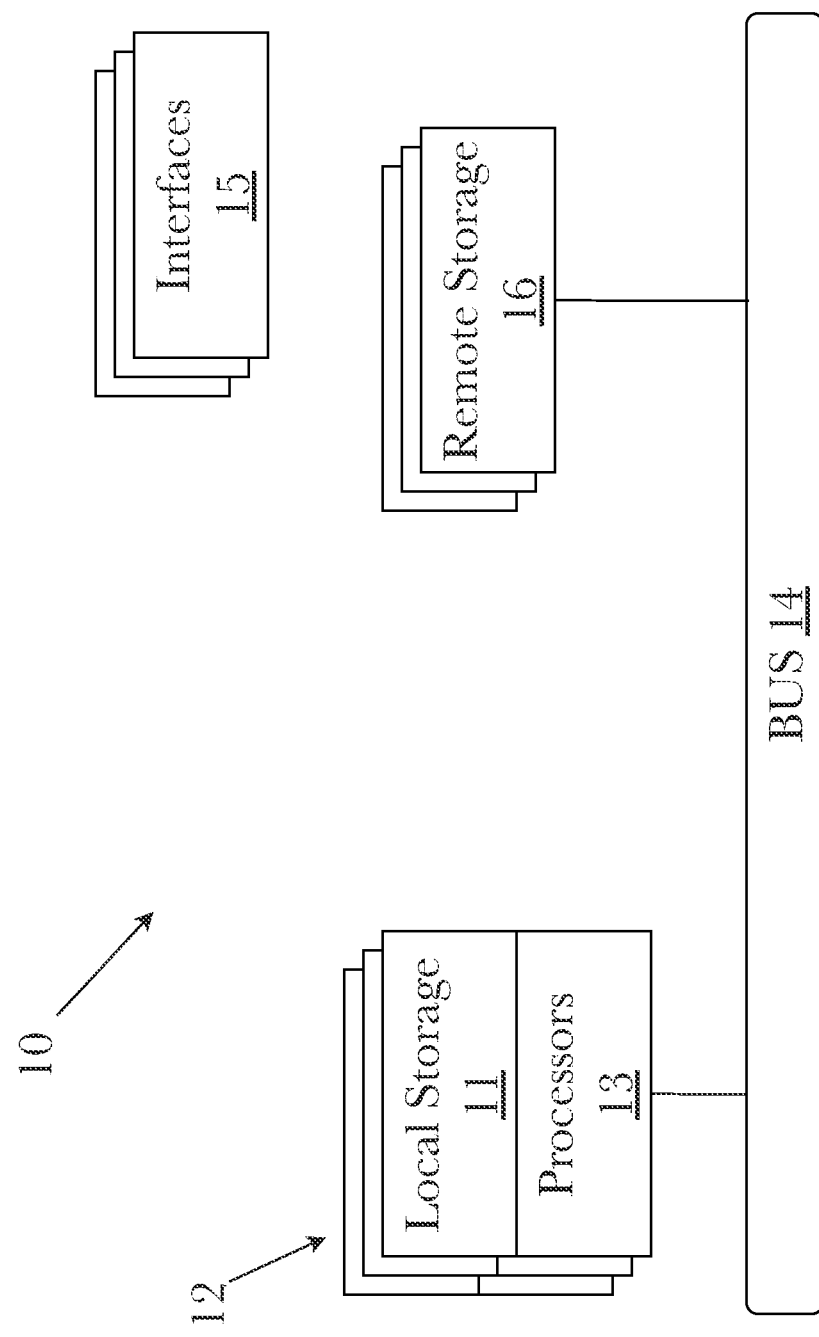
FIG. 13 is a block diagram illustrating an exemplary hardware architecture of a computing device.

Referring now to FIG. 13, there is shown a block diagram depicting an exemplary computing device 10 suitable for implementing at least a portion of the features or functionalities disclosed herein. Computing device 10 may be, for example, any one of the computing machines listed in the previous paragraph, or indeed any other electronic device capable of executing software- or hardware-based instructions according to one or more programs stored in memory. Computing device 10 may be configured to communicate with a plurality of other computing devices, such as clients or servers, over communications networks such as a wide area network a metropolitan area network, a local area network, a wireless network, the Internet, or any other network, using known protocols for such communication, whether wireless or wired.

In one aspect, computing device 10 includes one or more central processing units (CPU) 12, one or more interfaces 15, and one or more busses 14 (such as a peripheral component interconnect (PCI) bus). When acting under the control of appropriate software or firmware, CPU 12 may be responsible for implementing specific functions associated with the functions of a specifically configured computing device or machine. For example, in at least one aspect, a computing device 10 may be configured or designed to function as a server system utilizing CPU 12, local memory 11 and/or remote memory 16, and interface(s) 15. In at least one aspect, CPU 12 may be caused to perform one or more of the different types of functions and/or operations under the control of software modules or components, which for example, may include an operating system and any appropriate applications software, drivers, and the like.

CPU 12 may include one or more processors 13 such as, for example, a processor from one of the Intel, ARM, Qualcomm, and AMD families of microprocessors. In some aspects, processors 13 may include specially designed hardware such as application-specific integrated circuits (ASICs), electrically erasable programmable read-only memories (EEPROMs), field-programmable gate arrays (FPGAs), and so forth, for controlling operations of computing device 10. In a particular aspect, a local memory 11 (such as non-volatile random access memory (RAM) and/or read-only memory (ROM), including for example one or more levels of cached memory) may also form part of CPU 12. However, there are many different ways in which memory may be coupled to system 10. Memory 11 may be used for a variety of purposes such as, for example, caching and/or storing data, programming instructions, and the like. It should be further appreciated that CPU 12 may be one of a variety of system-on-a-chip (SOC) type hardware that may include additional hardware such as memory or graphics processing chips, such as a QUALCOMM SNAPDRAGON™ or SAMSUNG EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one aspect, interfaces 15 are provided as network interface cards (NICs). Generally, NICs control the sending and receiving of data packets over a computer network; other types of interfaces 15 may for example support other peripherals used with computing device 10. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT™, PCI, parallel, radio frequency (RF), BLUETOOTH™, near-field communications (e.g., using near-field magnetics), 802.11 (WiFi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 15 may include physical ports appropriate for communication with appropriate media. In some cases, they may also include an independent processor (such as a dedicated audio or video processor, as is common in the art for high-fidelity A/V hardware interfaces) and, in some instances, volatile and/or non-volatile memory (e.g., RAM).

Although the system shown in FIG. 13 illustrates one specific architecture for a computing device 10 for implementing one or more of the aspects described herein, it is by no means the only device architecture on which at least a portion of the features and techniques described herein may be implemented. For example, architectures having one or any number of processors 13 may be used, and such processors 13 may be present in a single device or distributed among any number of devices. In one aspect, a single processor 13 handles communications as well as routing computations, while in other aspects a separate dedicated communications processor may be provided. In various aspects, different types of features or functionalities may be implemented in a system according to the aspect that includes a client device (such as a tablet device or smartphone running client software) and server systems (such as a server system described in more detail below).

Regardless of network device configuration, the system of an aspect may employ one or more memories or memory modules (such as, for example, remote memory block 16 and local memory 11) configured to store data, program instructions for the general-purpose network operations, or other information relating to the functionality of the aspects described herein (or any combinations of the above). Program instructions may control execution of or comprise an operating system and/or one or more applications, for example. Memory 16 or memories 11, 16 may also be configured to store data structures, configuration data, encryption data, historical system operations information, or any other specific or generic non-program information described herein.

Because such information and program instructions may be employed to implement one or more systems or methods described herein, at least some network device aspects may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a JAVA™ compiler and may be executed using a Java virtual machine or equivalent, or files containing higher level code that may be executed by the computer using an interpreter (for example, scripts written in Python, Perl, Ruby, Groovy, or any other scripting language).

Figure 14:
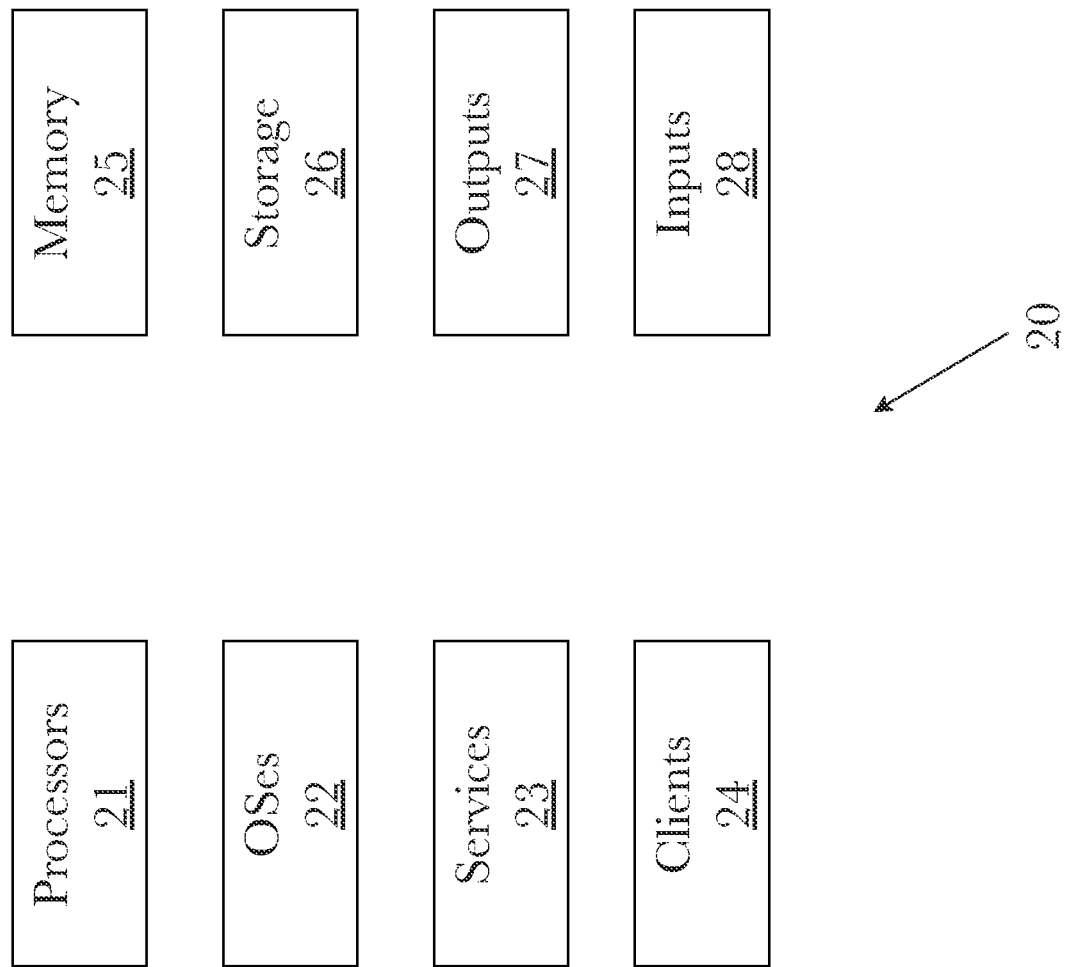
FIG. 14 is a block diagram illustrating an exemplary logical architecture for a client device.

In some aspects, systems may be implemented on a standalone computing system. Referring now to FIG. 14, there is shown a block diagram depicting a typical exemplary architecture of one or more aspects or components thereof on a standalone computing system. Computing device 20 includes processors 21 that may run software that carry out one or more functions or applications of aspects, such as for example a client application 24. Processors 21 may carry out computing instructions under control of an operating system 22 such as, for example, a version of MICROSOFT WINDOWS™ operating system, APPLE macOS™ or iOS™ operating systems, some variety of the Linux operating system, ANDROID™ operating system, or the like. In many cases, one or more shared services 23 may be operable in system 20, and may be useful for providing common services to client applications 24. Services 23 may for example be WINDOWS™ services, user-space common services in a Linux environment, or any other type of common service architecture used with operating system 21. Input devices 28 may be of any type suitable for receiving user input, including for example a keyboard, touchscreen, microphone (for example, for voice input), mouse, touchpad, trackball, or any combination thereof. Output devices 27 may be of any type suitable for providing output to one or more users, whether remote or local to system 20, and may include for example one or more screens for visual output, speakers, printers, or any combination thereof. Memory 25 may be random-access memory having any structure and architecture known in the art, for use by processors 21, for example to run software. Storage devices 26 may be any magnetic, optical, mechanical, memristor, or electrical storage device for storage of data in digital form (such as those described above, referring to FIG. 13). Examples of storage devices 26 include flash memory, magnetic hard drive, CD-ROM, and/or the like.

Figure 15:
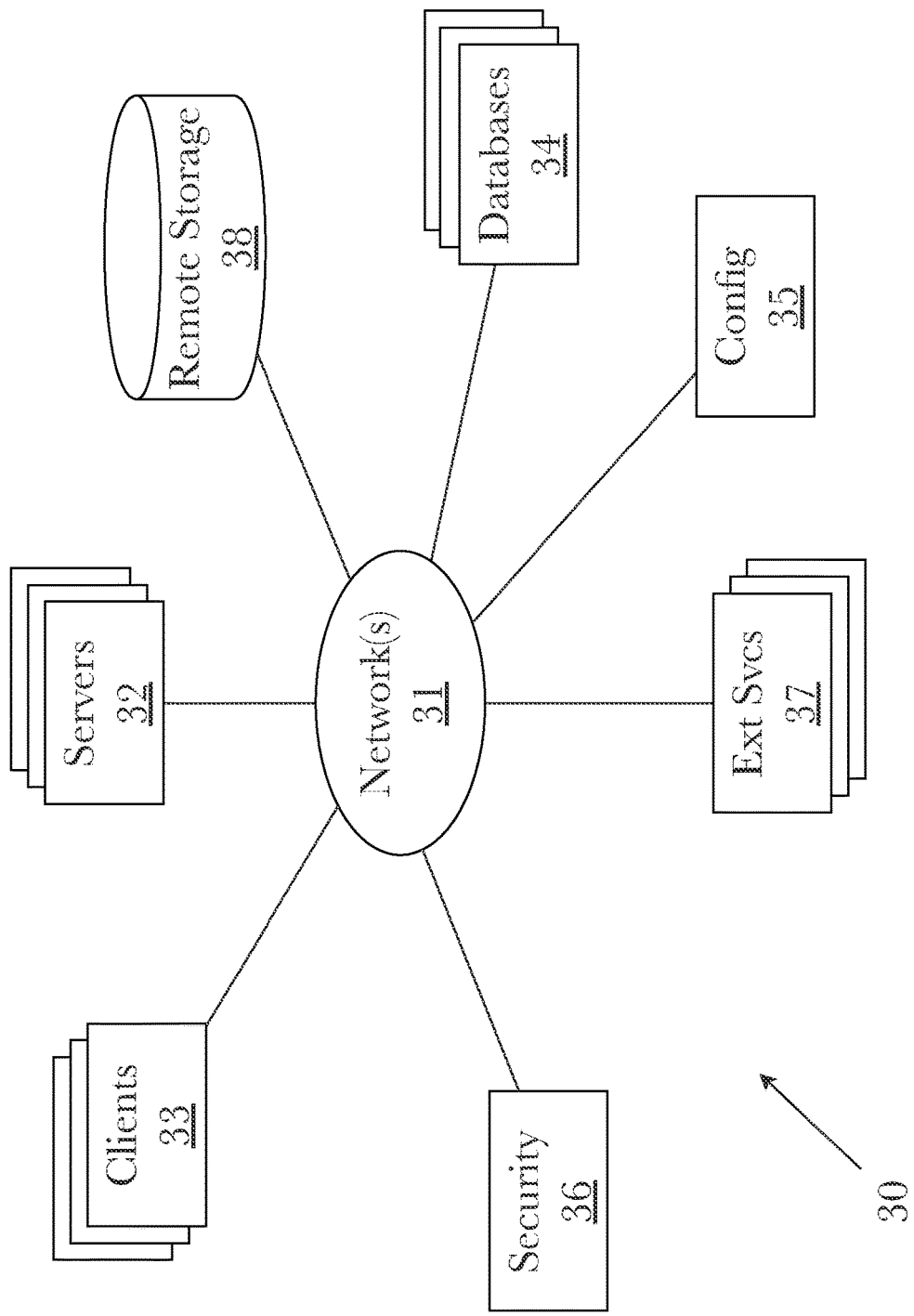
FIG. 15 is a block diagram showing an exemplary architectural arrangement of clients, servers, and external services.

In some aspects, systems may be implemented on a distributed computing network, such as one having any number of clients and/or servers. Referring now to FIG. 15, there is shown a block diagram depicting an exemplary architecture 30 for implementing at least a portion of a system according to one aspect on a distributed computing network. According to the aspect, any number of clients 33 may be provided. Each client 33 may run software for implementing client-side portions of a system; clients may comprise a system 20 such as that illustrated in FIG. 14. In addition, any number of servers 32 may be provided for handling requests received from one or more clients 33. Clients 33 and servers 32 may communicate with one another via one or more electronic networks 31, which may be in various aspects any of the Internet, a wide area network, a mobile telephony network (such as CDMA or GSM cellular networks), a wireless network (such as WiFi, WiMAX, LTE, and so forth), or a local area network (or indeed any network topology known in the art; the aspect does not prefer any one network topology over any other). Networks 31 may be implemented using any known network protocols, including for example wired and/or wireless protocols.

In addition, in some aspects, servers 32 may call external services 37 when needed to obtain additional information, or to refer to additional data concerning a particular call. Communications with external services 37 may take place, for example, via one or more networks 31. In various aspects, external services 37 may comprise web-enabled services or functionality related to or installed on the hardware device itself. For example, in one aspect where client applications 24 are implemented on a smartphone or other electronic device, client applications 24 may obtain information stored in a server system 32 in the cloud or on an external service 37 deployed on one or more of a particular enterprise's or user's premises. In addition to local storage on servers 32, remote storage 38 may be accessible through the network(s) 31.

In some aspects, clients 33 or servers 32 (or both) may make use of one or more specialized services or appliances that may be deployed locally or remotely across one or more networks 31. For example, one or more databases 34 in either local or remote storage 38 may be used or referred to by one or more aspects. It should be understood by one having ordinary skill in the art that databases in storage 34 may be arranged in a wide variety of architectures and using a wide variety of data access and manipulation means. For example, in various aspects one or more databases in storage 34 may comprise a relational database system using a structured query language (SQL), while others may comprise an alternative data storage technology such as those referred to in the art as "NoSQL" (for example, HADOOP CASSANDRA™, GOOGLE BIGTABLE™, and so forth). In some aspects, variant database architectures such as column-oriented databases, in-memory databases, clustered databases, distributed databases, or even flat file data repositories may be used according to the aspect. It will be appreciated by one having ordinary skill in the art that any combination of known or future database technologies may be used as appropriate, unless a specific database technology or a specific arrangement of components is specified for a particular aspect described herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, some aspects may make use of one or more security systems 36 and configuration systems 35. Security and configuration management are common information technology (IT) and web functions, and some amount of each are generally associated with any IT or web systems. It should be understood by one having ordinary skill in the art that any configuration or security subsystems known in the art now or in the future may be used in conjunction with aspects without limitation, unless a specific security 36 or configuration system 35 or approach is specifically required by the description of any specific aspect.

FIG. 16 shows an exemplary overview of a computer system 40 as may be used in any of the various locations throughout the system. It is exemplary of any computer that may execute code to process data. Various modifications and changes may be made to computer system 40 without departing from the broader scope of the system and method disclosed herein. Central processor unit (CPU) 41 is connected to bus 42, to which bus is also connected memory 43, nonvolatile memory 44, display 47, input/output (I/O) unit 48, and network interface card (NIC) 53. I/O unit 48 may, typically, be connected to peripherals such as a keyboard 49, pointing device 50, hard disk 52, real-time clock 51, a camera 57, and other peripheral devices. NIC 53 connects to network 54, which may be the Internet or a local network, which local network may or may not have connections to the Internet. The system may be connected to other computing devices through the network via a router 55, wireless local area network 56, or any other network connection. Also shown as part of system 40 is power supply unit 45 connected, in this example, to a main alternating current (AC) supply 46. Not shown are batteries that could be present, and many other devices and modifications that are well known but are not applicable to the specific novel functions of the current system and method disclosed herein. It should be appreciated that some or all components illustrated may be combined, such as in various integrated applications, for example Qualcomm or Samsung system-on-a-chip (SOC) devices, or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In various aspects, functionality for implementing systems or methods of various aspects may be distributed among any number of client and/or server components. For example, various software modules may be implemented for performing various functions in connection with the system of any particular aspect, and such modules may be variously implemented to run on server and/or client components.

The skilled person will be aware of a range of possible modifications of the various aspects described above. Accordingly, the present invention is defined by the claims and their equivalents.

What is claimed is:

1. A system for minimal contact in-person order fulfillment using a mobile device, comprising:
a server comprising at least a transaction page generator;
a mobile device comprising at least a first plurality of programming instructions stored in the at least one memory of, and operating on at least one processor of, a computer system, wherein the first plurality of programming instructions, when operating on the at least one processor, cause the computer system to:
allow a mobile device user to assemble an order, the order comprising at least an order description;
wherein completing the assembled order initiates a request for a QR code;
generate a QR code, the QR code comprising at least a user identification, an order description, and payment details; and
display the QR code; and
a transaction page generator comprising at least a second plurality of programming instructions stored in the at least one memory of, and operating on at least one processor of, a computer system, wherein the second plurality of programming instructions, when operating on the at least one processor, cause the computer system to:
receive a request for a generated transaction page from a point-of-sale;
generate at least one interactive web page for a business;
generate a URL associated with a specific user transaction based on a point-of-sale transaction page request; and
send the generated URL to a point-of-sale; and
a point-of-sale comprising at least a third plurality of programming instructions stored in the at least one memory of, and operating on at least one processor of, a computer system, wherein the third plurality of programming instructions, when operating on the at least one processor, cause the computer system to:
scan the QR code displayed by the mobile device;
request a generated transaction page from the transaction page generator;
receive the generated URL from the transaction page generator; and
send the URL to the mobile device, responsive to scanning the QR code.

2. The system of claim 1, wherein the point-of-sale is further configured to:
initiate a transaction;
allow a customer to insert a banking card;
wherein the banking card may be a credit card, debit card, gift card, or a prepaid banking card;
process an inserted banking card;
display a transaction completion message when a transaction is completed successfully; and
use data received from the mobile device to complete and finalize a transaction.

3. The system of claim 1, wherein the mobile device is further configured to:
load at least one interactive web page associated with the received URL;
allow a customer to interact with the at least one interactive web page; and
send data based on the customer interactions to the point-of-sale.

4. The system of claim 3, wherein the data based on the customer interactions is sent from a mobile device to a server, which then sends data to a point-of-sale in order for the point-of-sale to complete a transaction based on data from the customer interactions.

5. The system of claim 1, wherein the point-of-sale further comprises a card reader with a separate display from a cashier terminal or device.

6. The system of claim 1, wherein the server is operated by a financial institution for the purposes of facilitating business transactions for the financial institution's business clients.

7. The system of claim 1, wherein the mobile device further comprises a specialized application for scanning QR codes and interacting with the interactive web pages provided by a transaction page generator.

8. A method for minimal contact in-person order fulfillment using a mobile device, comprising the steps of:
- allowing a mobile device user to assemble an order, the order comprising at least an order description, using a mobile device;
- wherein completing the assembled order initiates a request for a QR code, using the mobile device;
- generating a QR code, the QR code comprising at least a user identification, an order description, and payment details, using the mobile device;
- displaying the QR code, using the mobile device;
- receiving a request for a generated transaction page from a point-of-sale, using a transaction page generator;
- generating at least one interactive web page for a business, using the transaction page generator;
- generating a URL associated with a specific user transaction based on a point-of-sale transaction page request, using the transaction page generator;
- sending the generated URL to a point-of-sale;
- scanning the QR code displayed by the mobile device, using a point-of-sale;
- requesting a generated transaction page from the transaction page generator, using the point-of-sale;
- receiving the generated URL from the transaction page generator, using the point-of-sale; and
- sending the URL to the mobile device responsive to scanning the QR code, using the point-of-sale.

9. The method of claim 8, further comprising the steps of:
- initiating a transaction, using the point-of-sale;
- allowing a customer to insert a banking card, using the point-of-sale;
- wherein the banking card may be a credit card, debit card, gift card, or a prepaid banking card, using the point-of-sale;
- processing an inserted banking card, using the point-of-sale;
- displaying a transaction completion message when a transaction is completed successfully, using the point-of-sale; and
- using data received from the mobile device to complete and finalize a transaction, using the point-of-sale.

10. The method of claim 8, further comprising the steps of:
- loading at least one interactive web page associated with the received URL, using the mobile device;
- allowing a customer to interact with the at least one interactive web page, using the mobile device; and
- sending data based on the customer interactions to the point-of-sale, using the mobile device.

11. The method of claim 10, wherein the data based on the customer interactions is sent from a mobile device to a server, which then sends data to a point-of-sale in order for the point-of-sale to complete a transaction based on data from the customer interactions.

12. The method of claim 8, wherein the point-of-sale further comprises a card reader with a separate display from a cashier terminal or device.

13. The method of claim 8, wherein the server is operated by a financial institution for the purposes of facilitating business transactions for the financial institution's business clients.

14. The method of claim 8, wherein the mobile device further comprises a specialized application for scanning QR codes and interacting with the interactive web pages provided by the transaction page generator.

* * * * *